US007707182B1

(12) United States Patent
Kee et al.

(10) Patent No.: US 7,707,182 B1
(45) Date of Patent: Apr. 27, 2010

(54) METHOD AND SYSTEM FOR AUTOMATICALLY UPDATING THE VERSION OF A SET OF FILES STORED ON CONTENT SERVERS

(75) Inventors: Thomas E. Kee, Seattle, WA (US); Ryan C. Kearny, Kenmore, WA (US); Donald Joseph DeCaprio, Issaquah, WA (US); Christian D. Saether, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 193 days.

(21) Appl. No.: 11/284,305

(22) Filed: Nov. 21, 2005

Related U.S. Application Data

(60) Division of application No. 10/056,821, filed on Jan. 25, 2002, now Pat. No. 7,113,962, which is a continuation-in-part of application No. 09/405,894, filed on Sep. 24, 1999, now Pat. No. 6,405,219.

(60) Provisional application No. 60/140,213, filed on Jun. 22, 1999.

(51) Int. Cl.
*G06F 12/00* (2006.01)
(52) U.S. Cl. .................. 707/638; 707/689; 709/203; 709/223; 715/229
(58) Field of Classification Search .............. 707/10, 707/203; 709/203, 223; 715/229
See application file for complete search history.

(56) References Cited

U.S. PATENT DOCUMENTS 3,950,735 A 4/1976 Patel

| 4,644,532 A | 2/1987 | George et al. |
| 4,965,772 A | 10/1990 | Daniel et al. |

(Continued)

FOREIGN PATENT DOCUMENTS

EP 0744850 A2 11/1996

(Continued)

OTHER PUBLICATIONS

U.S. Appl. No. 10/056,821, Notice of Allowance mailed Jun. 16, 2006.

(Continued)

*Primary Examiner*—Hosain T Alam
*Assistant Examiner*—Jieying Tang
(74) *Attorney, Agent, or Firm*—Darby & Darby P.C.; Jamie L. Wiegand

(57) ABSTRACT

A system and computer implementable method for updating content on servers coupled to a network. The method includes updating an origin server with a version of files used to provide content, retrieving data that indicates an action to be performed on one or more cache servers in conjunction with updating the origin server, and performing the action to update entries in the one or more cache servers. Each entry in each cache server is associated with a subset of the content on the origin server and may include an expiration field and/or a time to live field. An example of a subset of content to which a cache entry may be associated is a Web page. Cache servers are not required to poll origin servers to determine whether new content is available. Cache servers may be pre-populated using push or pull techniques.

17 Claims, 14 Drawing Sheets

U.S. PATENT DOCUMENTS

| | | | | |
|---|---|---|---|---|
| 5,023,826 | A | 6/1991 | Patel | |
| 5,053,953 | A | 10/1991 | Patel | |
| 5,299,312 | A | 3/1994 | Rocco, Jr. | |
| 5,327,529 | A | 7/1994 | Fults et al. | |
| 5,367,635 | A | 11/1994 | Bauer et al. | |
| 5,371,852 | A | 12/1994 | Attanasio et al. | |
| 5,406,502 | A | 4/1995 | Haramaty et al. | |
| 5,475,857 | A | 12/1995 | Dally | |
| 5,517,617 | A | 5/1996 | Sathaye et al. | |
| 5,519,694 | A | 5/1996 | Brewer et al. | |
| 5,519,778 | A | 5/1996 | Leighton et al. | |
| 5,521,591 | A | 5/1996 | Arora et al. | |
| 5,528,701 | A | 6/1996 | Aref | |
| 5,581,764 | A | 12/1996 | Fitzgerald et al. | |
| 5,596,742 | A | 1/1997 | Agarwal et al. | |
| 5,606,665 | A | 2/1997 | Yang et al. | |
| 5,611,049 | A | 3/1997 | Pitts | |
| 5,663,018 | A | 9/1997 | Cummings et al. | |
| 5,678,042 | A | 10/1997 | Pisello et al. | |
| 5,752,023 | A | 5/1998 | Choucri et al. | |
| 5,761,484 | A | 6/1998 | Agarwal et al. | |
| 5,768,423 | A | 6/1998 | Aref et al. | |
| 5,774,660 | A | 6/1998 | Brendel et al. | |
| 5,778,395 | A | 7/1998 | Whiting et al. | |
| 5,790,554 | A | 8/1998 | Pitcher et al. | |
| 5,875,296 | A | 2/1999 | Shi et al. | |
| 5,892,914 | A | 4/1999 | Pitts | |
| 5,919,247 | A | 7/1999 | Van Hoff et al. | |
| 5,933,834 | A | 8/1999 | Aichelen | |
| 5,936,939 | A | 8/1999 | Des Jardins et al. | |
| 5,946,690 | A | 8/1999 | Pitts | |
| 5,949,885 | A | 9/1999 | Leighton | |
| 5,959,990 | A | 9/1999 | Frantz et al. | |
| 5,974,460 | A | 10/1999 | Maddalozzo, Jr. et al. | |
| 5,983,281 | A | 11/1999 | Ogle et al. | |
| 5,991,306 | A * | 11/1999 | Burns et al. | 370/429 |
| 6,006,260 | A | 12/1999 | Barrick, Jr. et al. | |
| 6,006,264 | A | 12/1999 | Colby et al. | |
| 6,026,452 | A | 2/2000 | Pitts | |
| 6,028,857 | A | 2/2000 | Poor | |
| 6,038,601 | A * | 3/2000 | Lambert et al. | 709/226 |
| 6,051,169 | A | 4/2000 | Brown et al. | |
| 6,076,105 | A | 6/2000 | Wolff et al. | |
| 6,078,956 | A | 6/2000 | Bryant et al. | |
| 6,085,234 | A | 7/2000 | Pitts et al. | |
| 6,092,196 | A | 7/2000 | Reiche | |
| 6,108,703 | A | 8/2000 | Leighton et al. | |
| 6,111,876 | A | 8/2000 | Frantz et al. | |
| 6,145,011 | A | 11/2000 | Furukawa et al. | |
| 6,173,293 | B1 | 1/2001 | Thekkath et al. | |
| 6,298,319 | B1 | 10/2001 | Heile et al. | |
| 6,345,308 | B1 * | 2/2002 | Abe | 709/248 |
| 6,353,836 | B1 | 3/2002 | Bamford et al. | |
| 6,415,280 | B1 * | 7/2002 | Farber et al. | 707/2 |
| 6,594,664 | B1 | 7/2003 | Estrada et al. | |
| 6,629,138 | B1 * | 9/2003 | Lambert et al. | 709/224 |
| 7,003,587 | B1 * | 2/2006 | Battat et al. | 709/227 |
| 7,035,911 | B2 * | 4/2006 | Lowery et al. | 707/2 |
| 2002/0062384 | A1 * | 5/2002 | Tso | 709/229 |
| 2002/0065933 | A1 * | 5/2002 | Kobayashi | 709/234 |
| 2003/0074394 | A1 * | 4/2003 | Eshghi | 709/203 |

FOREIGN PATENT DOCUMENTS

| | | |
|---|---|---|
| WO | 9114326 A2 | 9/1991 |
| WO | 9505172 A1 | 2/1995 |
| WO | 9709805 A1 | 3/1997 |
| WO | 9745800 A1 | 12/1997 |
| WO | 9905829 A1 | 2/1999 |
| WO | 9906913 A1 | 2/1999 |
| WO | 9910858 A2 | 3/1999 |
| WO | 9939373 A2 | 8/1999 |
| WO | 9964967 A1 | 12/1999 |
| WO | 0004422 A2 | 1/2000 |
| WO | 0004458 A1 | 1/2000 |

OTHER PUBLICATIONS

U.S. Appl. No. 10/056,821, Non-Final Office Action mailed Nov. 22, 2005.

U.S. Appl. No. 10/056,821, Advisory Action mailed Aug. 12, 2005.

U.S. Appl. No. 10/056,821, Final Rejection mailed Jun. 3, 2005.

U.S. Appl. No. 10/056,821, Non-Final Office Action mailed Aug. 3, 2004.

"A Process for selective Routing of Servlet Content to Transcoding Modules," Research Disclosure 422124, IBM Corporation, pp. 889-890, Jun. 1999.

"Servlet/Applet/HTML Authentication Process With Single Sign-On," Research Disclosure 429128, IBM Corporation, pp. 163-164, Jan. 2000.

"Global-Site Content Controller Administrator Guide," F5 Networks, Seattle, WA, Apr. 2000.

* cited by examiner

METHOD AND SYSTEM FOR AUTOMATICALLY UPDATING THE VERSION OF A SET OF FILES STORED ON CONTENT SERVERS

CROSS-REFERENCE TO RELATED APPLICATIONS

This Application is a Divisional of U.S. patent application Ser. No. 10/056,821, filed on Jan. 25, 2002, which is a continuation-in-part of U.S. patent application Ser. No. 09/405,894, filed on Sep. 24, 1999 and issued on Jun. 11, 2002 as U.S. Pat. No. 6,405,219, which claims the benefit of U.S. provisional patent application Ser. No. 60/140,213, filed Jun. 22, 1999, all of which are incorporated by reference herein.

FIELD OF THE INVENTION

This application relates generally to updating geographically distributed servers on a network, and, more specifically, to coordinating updates to origin servers with cache servers.

BACKGROUND OF THE INVENTION

Often, source files for Web content servers are coded by multiple programmers on remotely located (stage) source servers. It is not unusual for one programmer(s) to code "HTML" files on one source server while another programmer(s) creates executable and/or image files on another source server. Once a programmer debugs a newly created/edited update file, it is eventually distributed to each content server and placed in a corresponding file directory. Historically, the distribution of the current version of a set of "updated" or new files from remotely located source servers through the Internet to content servers has proven to be a difficult task for several reasons. One reason is that the file directory structure and hardware configuration can vary between individual Web content servers. In this case, the distribution of a set of files for each Web content server must be separately organized according to each server's file directory structure and hardware capabilities. Another reason is that the actual size of the set of files may be so large that their distribution is relatively slow on a network with limited bandwidth capabilities. Another reason relates to how cache servers caching the content should be updated.

SUMMARY OF THE INVENTION

The present invention is directed to a method for updating content on servers coupled to a network. The method includes updating an origin server with a version of files used to provide content, retrieving data that indicates an action to be performed on one or more cache servers in conjunction with updating the origin server, and performing the action to update entries in the one or more cache servers. Each entry in each cache server is associated with a subset of the content on the origin server and may include an expiration field and/or a time to live field. An example of a subset of content to which a cache entry may be associated is a Web page. Also, each cache server need not poll an origin server to determine whether new content is available.

In accordance with other aspects of the invention, cache servers are pre-populated with content to speed future access. In some aspects of the invention, cache servers pre-populate entries by pulling content from one or more origin servers. In other aspects of the invention, entries on cache servers are pre-populated as servers push content onto the cache servers.

In accordance with one aspect of the invention, only selected content is expired on cache servers when content is updated on origin servers. In accordance with another aspect of the invention, all content on a cache server is expired when content is updated on origin servers.

In accordance with another aspect of the invention, updating content involves taking some origin servers offline, updating content on them, and bringing them back online, reading data that indicates an action to be performed on cache server in conjunction with updating content on the offline origin servers, performing the action indicated, and then taking other origin servers offline, updating content on the other origin servers, and bringing them back online. During such an update process, at least one origin server is available to server a request for content. In one aspect of the invention, origin servers are taken offline and brought back online in two groups.

In accordance with another aspect of the invention, when updating content, cache servers are placed in a mode of checking for new content. In this mode, the cache servers check for new content after receiving each request for content, even if a cache entry indicates that the content requested has not expired. After origin servers are updated, cache servers are placed back into a normal mode (of not checking for new content after each request) and all non up-to-date cache entries in the cache servers are expired.

In accordance with another embodiment, the present invention is directed to a system that includes an origin server, a cache server, and another server and which implements substantially the same functionality as the methods described above. Also, another embodiment of the invention is directed to a modulated data signal that enables actions that perform substantially the same methods as those described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
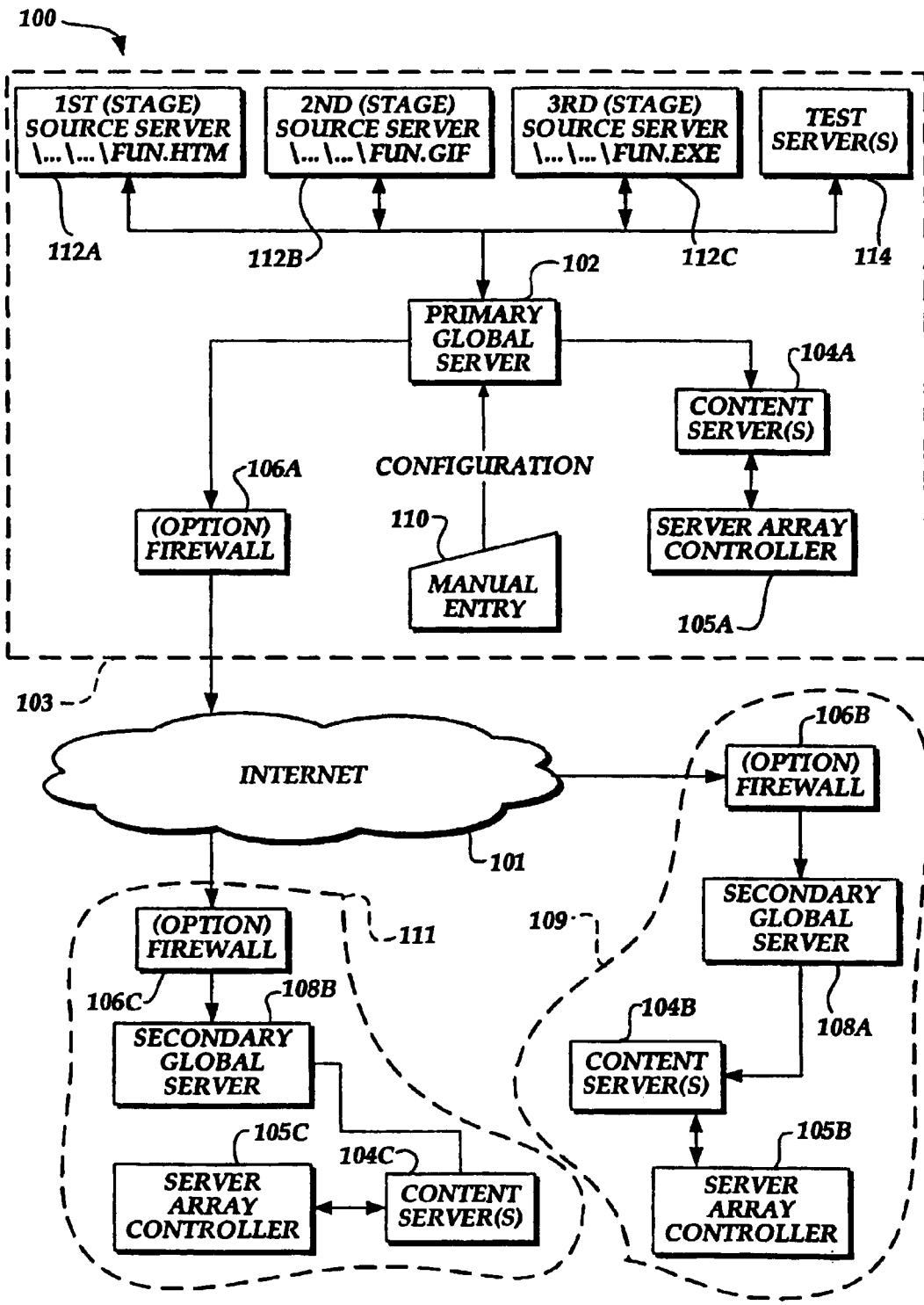
FIG. 1 illustrates an overview of the system architecture for implementing the present invention.

The present invention provides for managing the distribution and synchronization of a set of updated content and application (source) files for remotely located heterogeneous content servers with reduced impact on a network's bandwidth. A particular set of source files or cache entries for each content server is automatically updated. The present invention is typically employed with a Primary global server that is in communication with local source servers and local content servers. Also, the Primary global server may be used with at least one geographically separate Secondary global server that is in communication with other content servers that are local to the Secondary global server.

Generally, the new or changed (updated) set of source files for the origin servers are created on the source servers. The Primary global server stores a representation of the source servers' current version of the set of updated source files either at determined intervals or at the direction of a user. The copied set of source files includes the name, time stamp and size of each source file. The Primary global server also stores configuration files indicating the particular file directory structure and hardware constraints for each origin server that is locally coupled to the Primary global server and each Secondary global server. The origin server hardware constraints are usually entered manually into the Primary global server. Alternatively, the Primary and Secondary global servers may automatically determine access control and account information for each origin server on the network.

The Primary global server generates a version delivery list for each Secondary global server that indicates a particular update version for each local origin server. The version delivery list also includes the file directory structure and the hardware constraints of each local origin server. The Primary global server also generates a version change container for each Secondary global server based on its path and the difference between the updated version of the set of source files stored in a versioned file tree repository on the Primary global server and the current version of the set of source files stored in another versioned file tree repository on each Secondary global server. At a determined interval, the version delivery lists and the version change containers are distributed from the Primary global server to each Secondary global server. Also, each Secondary global server employs the set of source files included with the version change container to update the version of the set of source files stored in the Secondary global server's versioned file tree repository.

The Primary global server and each Secondary global server generate a current version of the set of new and/or changed source files and files to be removed for each local origin server based on the update version identified in the version delivery list. The Primary and Secondary global server generate a content change container that includes the current version of the set of new and/or changed source files and indicates which source files are to be removed on each local origin server. Employing the contents of the content change container, each Secondary global server will make the update version changes as indicated in the version delivery list by copying the update version of the set of new and/or changed source files to temporary sub-directories on each of their associated local origin servers. Similarly, the Primary global server will copy the update version of the set of new and/or changed source files to temporary sub-directories on each of its associated local content servers. The Primary and Secondary global servers change the version of the set of source files on the local origin servers by renaming the update version of the set of source files copied to the temporary sub-directories.

Additionally, when a user indicates that a current version of the set of source files on the local origin servers should be rolled back to a previous version, the Primary global server creates a "rollback" version delivery list that is provided to each Secondary global server. A Secondary global server employs the previous version indicated in the rollback version delivery list to generate the previous version of the set of source files necessary to restore the previous version of the set of source files. These source files are copied to a temporary sub-directory on each local origin server. Similarly, the Primary global server generates the previous version of the set of source files and copies these files to a temporary sub-directory on each local origin server.

The Primary and Secondary global servers rollback to the previous version by renaming the set of source files copied to the temporary sub-directories on the local origin servers. Additionally, when the set of source files are copied to the subdirectories on the local origin servers, the Primary and Secondary global servers will delete source files that did not exist in the previous version and they may temporarily disable user access to the local content servers until the previous version of the set of source files are renamed.

Encryption may be provided for all communication between the Primary Global server, Secondary global server (s) and the local origin servers. Also, file compression may be provided for the distribution of version change containers between the Primary global server and the Secondary global server(s). The present invention may employ any file access method to gain file level access to a source file on a server including a file transport protocol (FTP), network file system (NFS), computer interconnect file system (CIFS) and multicast file transfer protocol (MFTP).

System Overview

FIG. 1 illustrates an overview 100 of the present invention employed in a network environment that includes a wide area network such as the Internet 101.

FIG. 1 includes a data center 103 coupled to the Internet 101. The data center 103 includes source servers 112A, 112B and 112C for creating file based content and applications, e.g., HTML pages, graphic image format (GIF) images and executables, and a test server 114 for testing new and changed source files. The data center 103 also includes a Primary global server 102 in communication with an optional firewall server 106A, local content servers 104A, a server array controller 105A and a manual entry device 110. The Primary global server 102 is connected to the Internet 101 (optionally through firewall server 106A) and is in communication with the source servers 112A-C and the test server 114.

The manual entry device 110 enables a user to provide information for the Primary global server 102 including server configuration, file distribution profiles, hardware constraints and set up rules. The Primary global server 102 provides the current version of a set of source files to the local content servers 104A. The server array controller 105A manages access to the information, e.g., content and applications, on the local content servers 104A. Typically, a server array controller manages a pool of redundant content (node) servers to provide access to requested resources. An example of a server array controller is the BIG-IP® controller produced by F5 Networks, Inc. of Seattle, Wash.

The Primary global server 102 distributes containers to Secondary global servers 108A and 108B across the Internet 101. The Secondary global servers 108A and 108B form part of geographically separate data centers 109 and 111. The Secondary global servers 108A and 108B are shown coupled through optional firewall servers 106B and 106C, respectively, to the Internet 101. Each of the Secondary global servers 108A and 108B are in communication with one of more local content servers 104B and 104C, respectively. As a result, the Secondary global servers 108A and 108B can provide a current version of a set of source files to their associated local content servers 104B and 104C. Each geographically separate data centers 109 and 111 also includes a server array controller 105B and 105C to manage access to the content and applications on the local content servers 104B and 104C. FIG. 1 should be considered exemplary, not limiting. If desired, one or more than two, geographically separated data centers may be included in a network employing the present invention.

In another embodiment, the present invention can be employed to provide updates to a content server that is not managed by a server array controller. Additionally, the Primary global server can implement the present invention without the use of Secondary global servers at geographically separate data centers, such an embodiment of the invention would be employed when all of the content servers are local to the data center that includes the Primary global server.

Flowcharts

Figure 2:
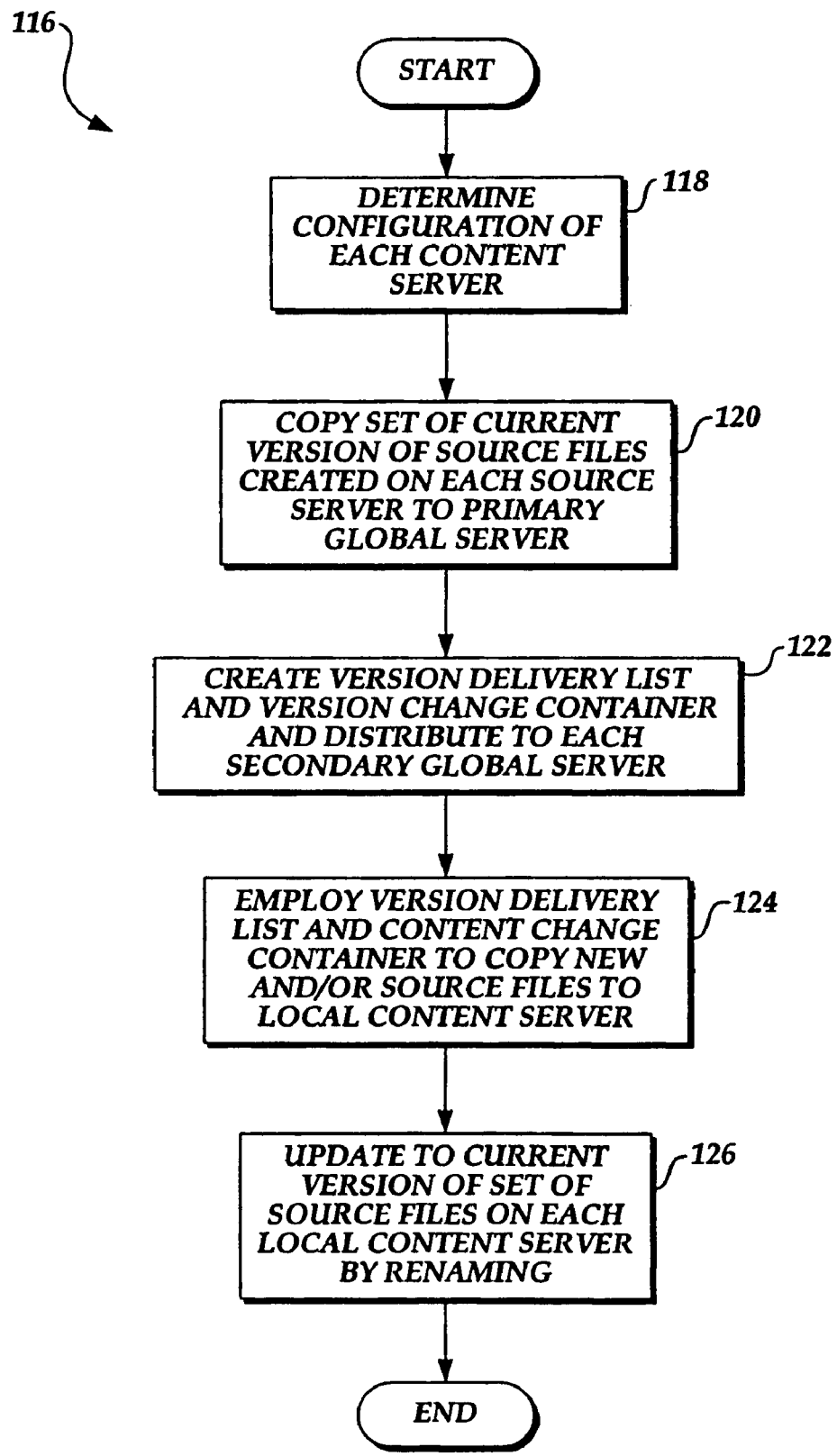
FIG. 2 is a flowchart showing an overview of the process for updating files on remotely located content servers.

FIG. 2 is a flowchart illustrating an overview 116 of the process for providing a current version of a set of source files from at least one source server to a plurality of content servers. Moving from a start block, the process moves to a block 118 where configuration information from each content server is determined e.g., paths, file directory structure and hardware constraints. The determination can be made by recording entered configuration information (hardware and software). Alternatively, the Primary and Secondary global servers may automatically read the configuration information of each local content server. The configuration information may be provided out of band to each Primary and Secondary global server when new configuration information becomes available and/or at determined intervals.

The process flows to a block 120 where the set of source files created on the source servers are identified according to name, size and date of creation/modification. A Primary global server copies only those source files from the source servers that are determined to be different than the set of source files stored in the versioned file tree repository on the Primary global server. As a result, the present invention employs differences to identify the source files that are to be copied from the source servers to the Primary global server.

Advancing to a block 122, the Primary global server creates a particular version delivery list for each Secondary global server. The version delivery list indicates the version upgrade for each set of source files on each local content server.

Also, the Primary global server creates a version change container based on the difference between the current version of the set of source files stored in the versioned file tree repository on the Primary global server and the version of the set of source files stored in another versioned file tree repository on each Secondary global server. The version change container references the names of all of the source files that are included in or deleted from the current version of the set of source files. The version change container also includes the actual file data for each new source file and a portion of the file data for each existing source file that was modified in the current version of the set of source files.

After the creation of the version delivery lists and the version change container, the Primary global server provides copies of the version change container and the particular version delivery list on each Secondary global server. It is understood that the Primary global server stores a copy of each version of a source file from a source server that is determined to be different than the version of the source file on the Primary global server. Alternatively, each Secondary global server stores a copy of each version of a source file that is provided in a version change container from the Primary global server in the Secondary global server's versioned file tree repository.

The process advances to a block 124 where the Primary global server and each Secondary global server create a content change container for each local content server and copy new and/or changed source files to at least one sub-directory on the corresponding local content server. For each Primary and Secondary global server, the copied source files are based on previously determined configuration information for a particular local content server and the version of the set of source files identified in the version delivery list. Since the present invention "assumes" that a previously copied source file on a content server is persistent, another copy of a previously copied and unchanged version of a source file is not included in the set of the current version of source files that are copied to a sub-directory on the local content server, i.e. the Primary and Secondary global servers copy the actual file data for the current version of new and modified source files to sub-directories on local content servers.

The process flows to a block 126 where the Primary and Secondary global servers update the version of the set of source files on each local content server by renaming the source files copied to a sub-directory on each local content server. Also, any previously copied source files that were removed from the current version of the set of source files are deleted on each content server. When the renaming and/or deleting is completed, the process moves to an end block and returns to processing other actions.

Figure 3A:
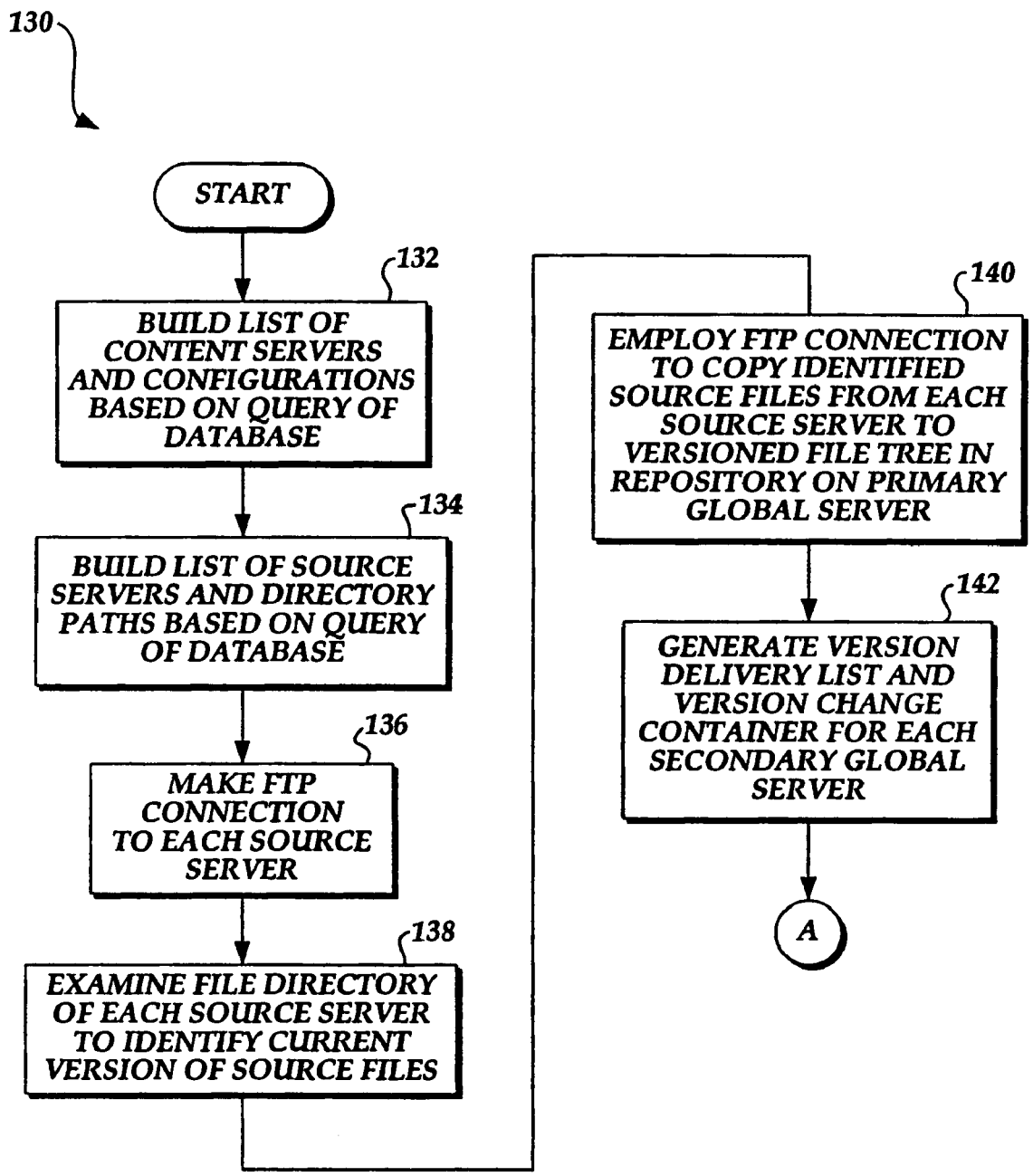
FIGS. 3A-3C are flowcharts that illustrate in more detail the process for updating files on remotely located content servers.
Figure 3B:
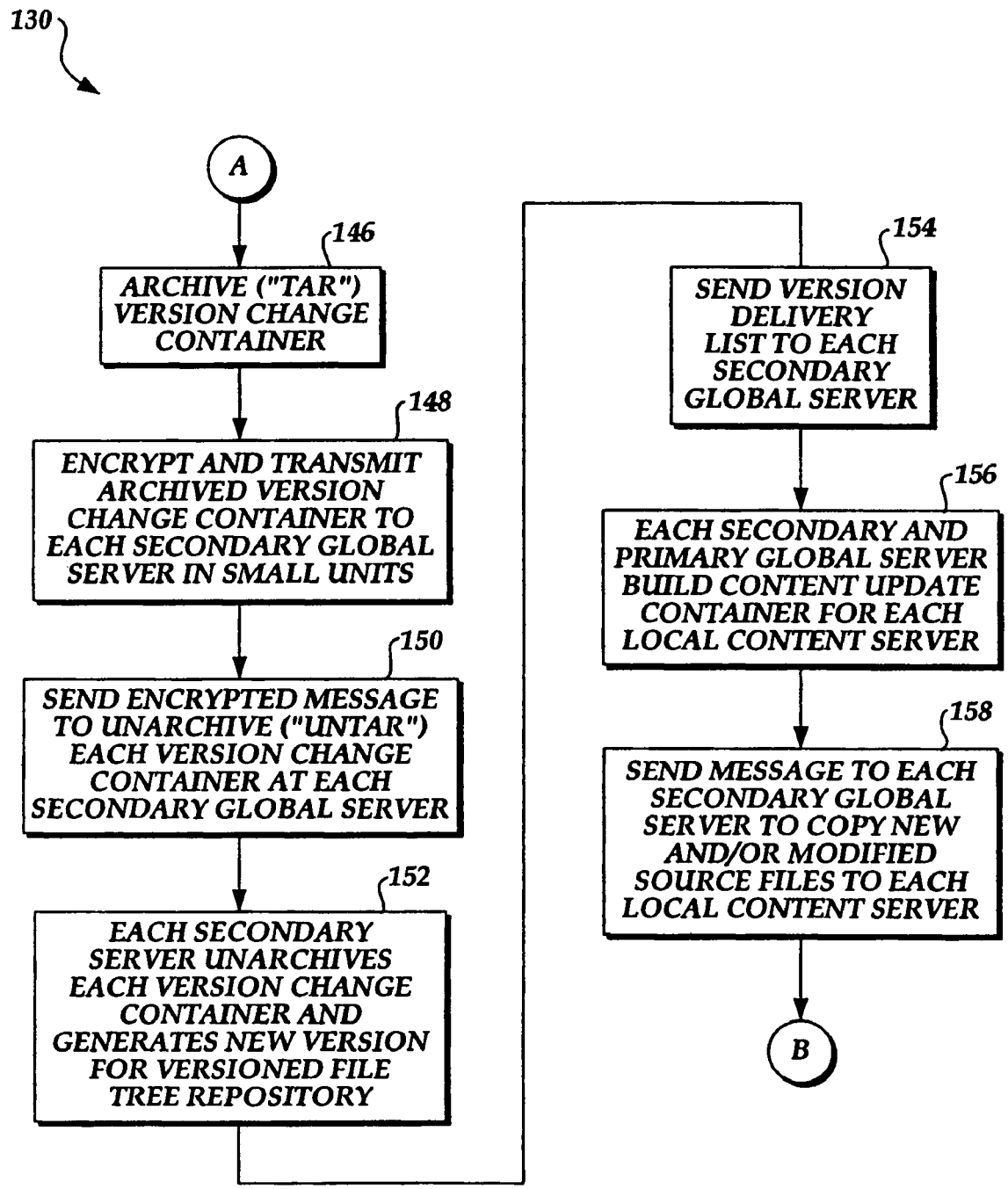
Figure 3C:
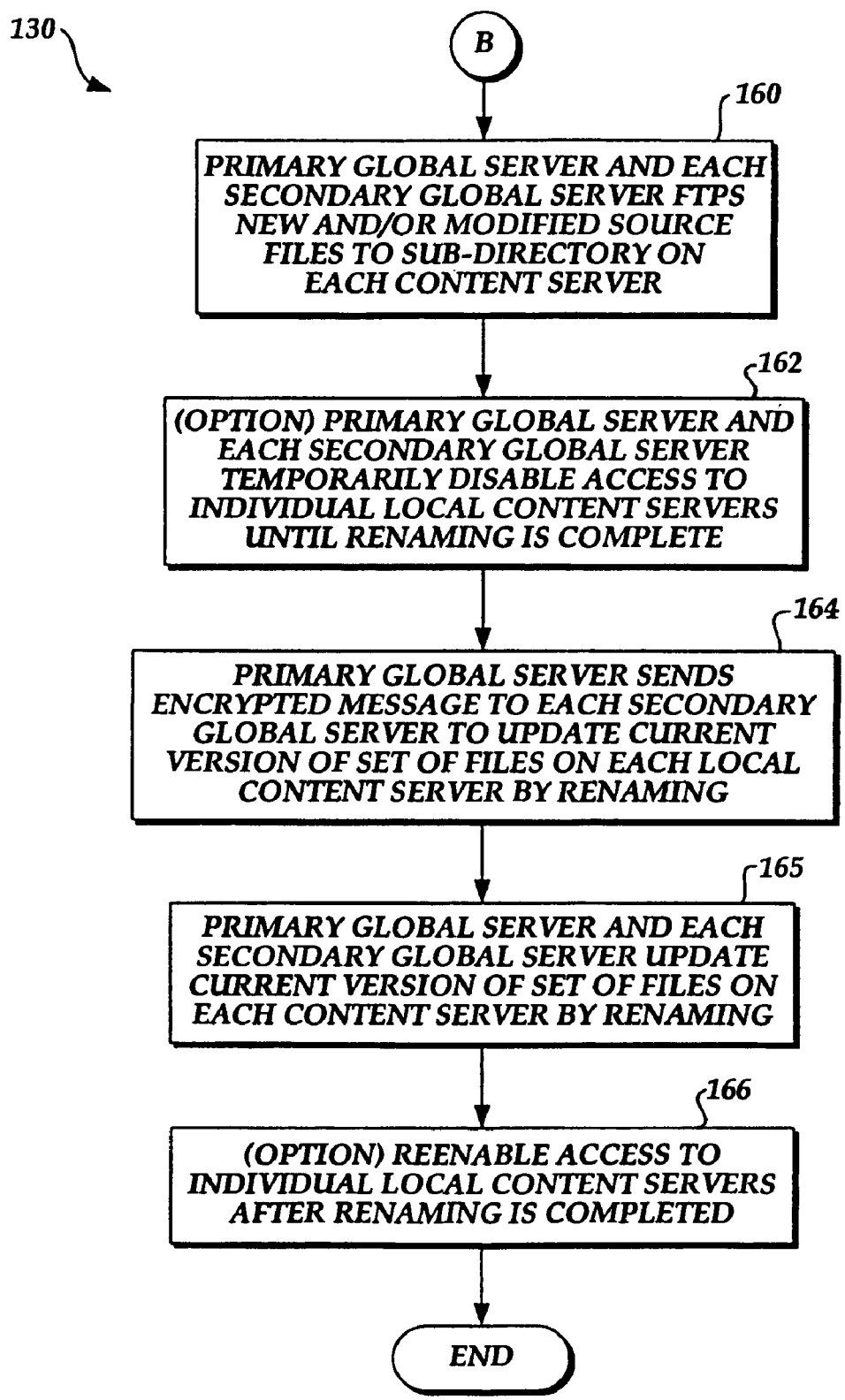

FIGS. 3A-3C form a flowchart 130 that shows in greater detail the process performed by the present invention. Starting with FIG. 3A, the process moves from a start block and steps to a block 132 where the Primary global server queries a database that stores information about content servers coupled to the network and uses the results of the query to build a list of content servers and their hardware/software configuration. The process flows to a block 134 where the Primary global server uses the results of another query of the database to build a list of the available source servers and their respective paths.

The process advances to the block 136 where the Primary global server gains file level access to each source server with an FTP connection. The process moves to a block 138 where the Primary global server examines the source (content and application) files on each source server and identifies each new and/or modified source file by comparing the name, time stamp and size of each source file on each source server to the current version of each source file stored on the Primary global server in a versioned file tree.

When a source file with the same name exists on both a source server and the Primary global server, the present invention identifies the most current version by comparing their sizes and time stamps. If the sizes of the source files with the same name are different or the time stamp of the source file on the source server is different than the time stamp of the Primary global server's source file, the source server's source file is identified as the most current version. Further, when another source file with the same name is not on the Primary global server, the source file on the source server is identified as the current version. Also, when a named source file only exists on a Primary global server, this source file is not identified as a member of the current version of the set of source files.

The process flows to a block 140 where the Primary global server gains file level access (FTP connection) to each source server that includes a source file that is identified as different than the current version of that particular file in the versioned file tree on the Primary global server. Each identified source file is copied to a new version in the versioned file tree repository on the Primary global server.

The Primary global server calls a library, e.g., the Revision Control Engine (RCE), to store file level differences between the current and previous versions of each source files. A discussion of FIGS. 6A and 6B below presents the functionality of the versioned file tree repository in greater detail.

In another embodiment, another file access protocol may be employed to transfer information, e.g., files, messages and data, between the Primary, Secondary, source and content servers. This other protocol could use a single port to enable all of the functions of the present invention, such as enabling the Primary global server to control the operation of the Secondary global server.

The process moves to a block 142 where the Primary global server generates version delivery lists and a list of Secondary global servers and their respective paths. Also, the Primary global server generates a version change container for each Secondary global server that may include a reference value associated with the current version of the set of source files.

Turning to FIG. 3B from FIG. 3A, the process advances to a block 146 where the Primary global server archives (compresses) each version change container. A third party facility may be used to implement a tape archive (TAR) command to compress each version change container. The process moves to a block 148 where a copy of the archived version change container is encrypted and transmitted to each Secondary global server. To reduce any adverse impact on the bandwidth capacity of the network, each version change container may be broken down into relatively small units that are individually encrypted and transmitted to a Secondary global server.

The process moves to a block 150 where the Primary global server sends an encrypted message to each Secondary global server to unarchive the version change container. The process advances to a block 152 where each Secondary global server unarchives the relatively small transmitted units and copies each unarchived source file to a new version in the versioned file tree repository on each Secondary global server.

The process flows to a block 154 where the Primary global server sends a version delivery list to each Secondary global server. In this case, the version delivery list indicates the current version, however, it should be appreciated that this list could indicate a previous version of the set of source files.

The process flows to a block 156 where the Primary global server and the Secondary global server build a content update container for each local content server that includes the actual file data (new source files and modified portions of previously existing source files) and indicate each source file to be deleted from the content server. The content update container is based on the two versions identified in the version delivery list. The process advances to a block 158 where the Primary global server sends an encrypted message to each Secondary global server to copy the new and/or modified source files in the content update container to at least one subdirectory on each local content server.

Moving from FIG. 3B to FIG. 3C, the process flows to a block 160 where the Primary global server and each Secondary global server gain file level access to the file directory on each local content server and copy the new and/or source files to a sub-directory on each local content server.

Optionally, the process may move to a block 162 where the Primary and each Secondary global server will disable access to a local content server until the renaming of the current version of the set of source files is completed. In another embodiment, the present invention may start renaming source files from the "bottom" up of a local content server's file directory and may not disable access to the local content server during the copying/renaming process. It is envisioned that the Primary global server may provide a separate encrypted message to each Secondary global server to disable access to the local content servers during the renaming process.

The process advances to a block 164 where the Primary global server sends an encrypted message to each Secondary global server to update the version of the set of source files stored on each local content server by renaming the actual source file data copied to a sub-directory on each local content server.

At block 165, the Primary and Secondary global servers update the version of the set of source files on each local content server by renaming. A previous version of an individual source file and a deleted source file are removed when the current version of the set of source files are renamed.

Optionally, the process advances to a block 166 where each Secondary global server will re-enable access to each local content server disabled for the renaming. Also, it is envisioned that the Primary global server may provide a separate encrypted message to each Secondary global server for enabling access to the local content servers after the renaming process is completed. Next, the process flows to an end block and returns to processing other actions.

Figure 4:
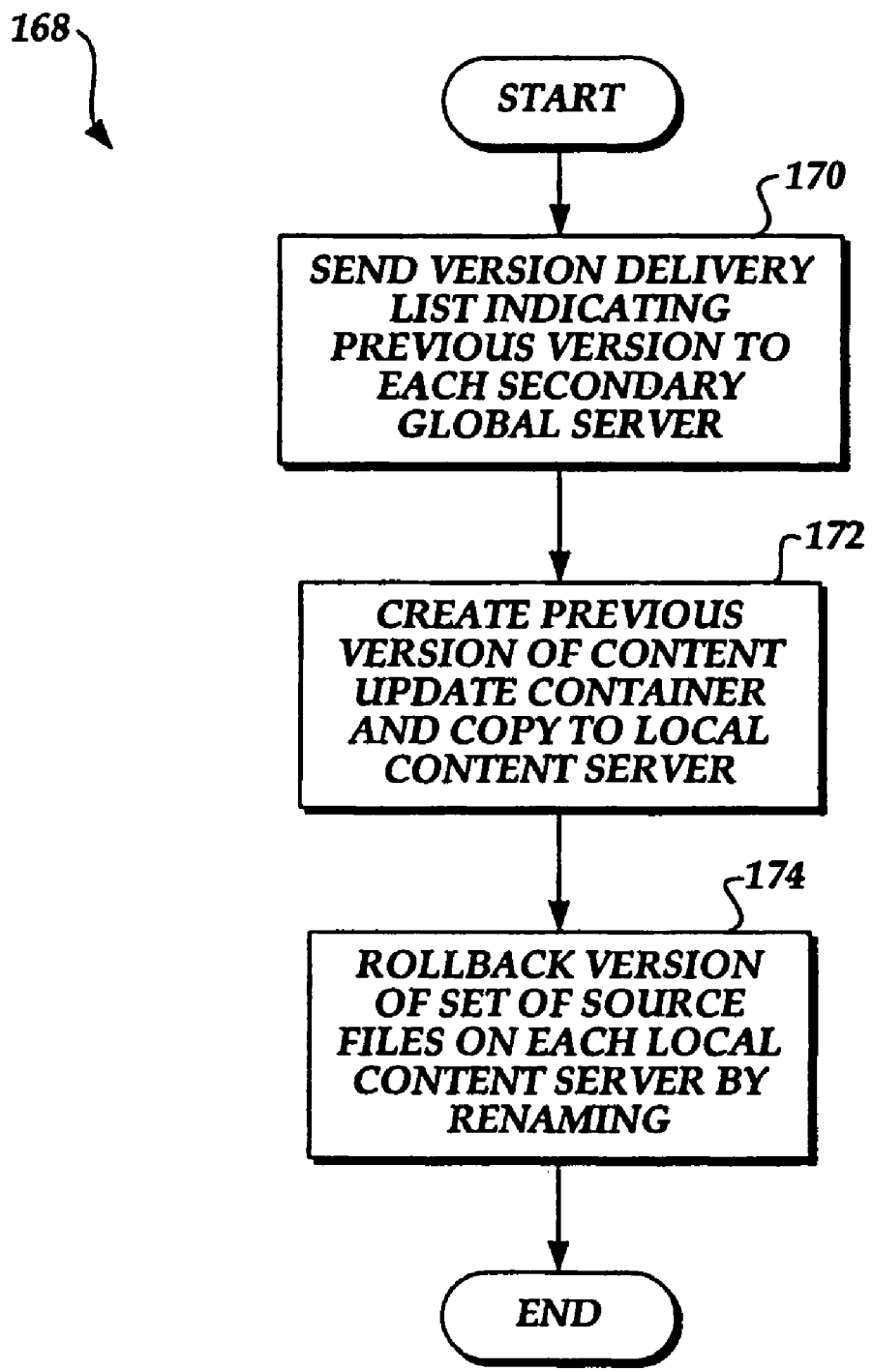
FIG. 4 is a flowchart showing the process for rolling back a version of files on remotely located content servers.

In FIG. 4, a flowchart is shown illustrating an overview 168 of the process for "rolling back" the current version of the set of source files stored on local content servers to a previous version. Advancing from a start block, the process moves to a block 170 where the Primary global server sends a version delivery list to each Secondary global server indicating a previous version of the set of source files stored in a versioned file tree repository on the Secondary global server.

The process advances to a block 172 where the Primary and Secondary global servers generate a content update container that includes a previous version of the set of source files for each local content server. The Primary and Secondary global servers copy the previous version of modified source files and restore removed source files from the previous version to at least one sub-directory on the local content servers. The process flows to a block 174 where the Primary and Secondary global servers cause the version of the set of source files on each local content server to roll back by renaming the previous version of the set of source files included in the content update container copied to the a sub-directory on each local content server. Also, any version of the source files that are newer than the previous version are deleted at this time. Next, the process advances to an end block and returns to processing other actions.

Although not shown, the present invention may be employed to rollback or increase more than one version of the set of source files at a time. For example, when one content server has a first version of the set of source files and other content servers have the second version of these source files, the present invention will separately update the first version to the second version before updating every content server to the third version of the set of source files.

The present invention is relatively fault tolerant because each (Primary and Secondary) global server can store redundant copies of all of the information stored in the repositories of every other server, e.g., several previous versions of the set of source files. If the Primary global server or any one of the Secondary global servers should fail, the related information can be provided to a replacement (Primary or Secondary) global server from the information stored in a versioned file tree repository on any one of the other operational global servers.

Data Structures

Figure 5A:
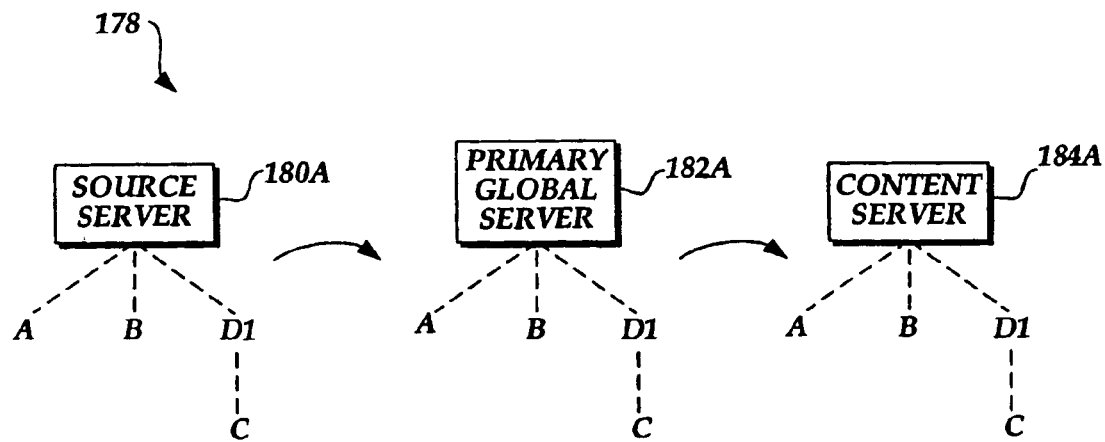
FIG. 5A is an overview of the file directory structure for an initial version of a set of source files that are created on a source server and copied to a Primary global server and a content server.

FIG. 5A illustrates an overview 178 of the file directory structure for a first version of the set of source files that is distributed from a source server 180A to a Primary global server 182A and a content server 184A. For all three of these servers, files "A" and "B" are shown one level below the root directory and file "C" is shown below the "D1" sub-directory root.

Figure 5B:
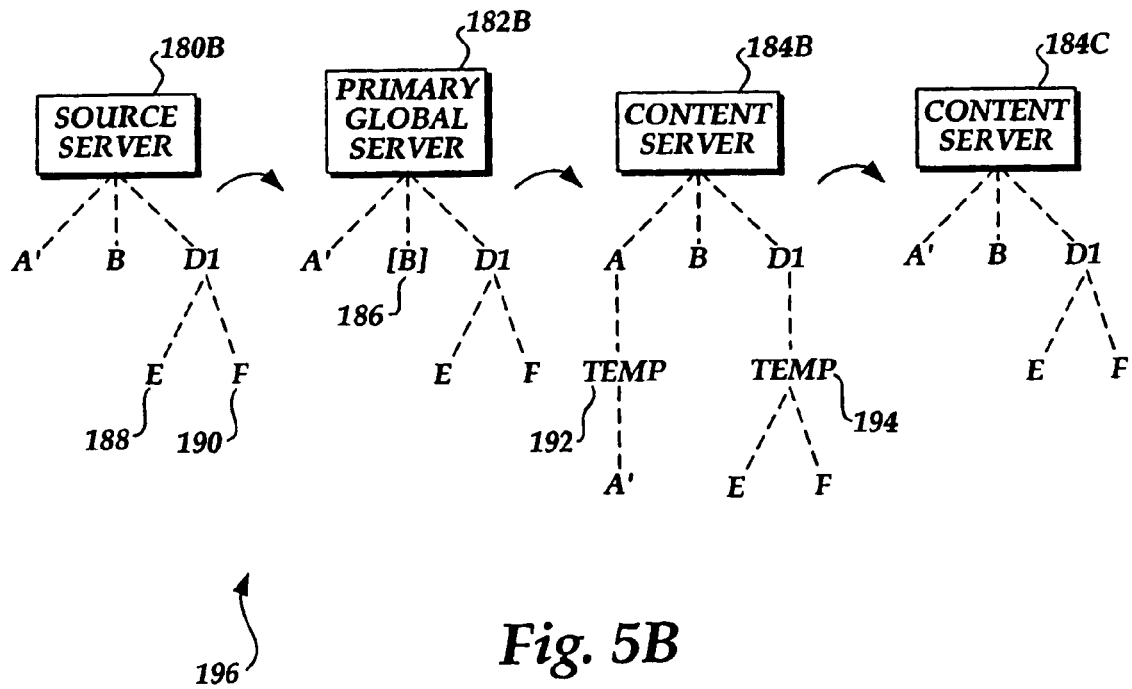
FIG. 5B is an overview of the file directory structure for an updated version of the set of source files that are created on the source server and copied to the Primary global server and the content server.

FIG. 5B shows an overview 196 of the file directory structure at each server when a second version of the set of source files is copied from a source server 180B to a Primary global server 182B and then to a content server 184B. At the source server 180B, the file directory structure of the second version of the set of source files is substantially similar to the first version shown in FIG. 5A except that the "C" file is deleted and new source files "D" and "E" are disposed below the "D1" sub-directory root. Also, the second version of the set of source files includes a modified source file "A'."

At the Primary global server 182B, the file directory structure of the second version of the set of source files is substantially similar to the second version of the set of source files stored at the source server 180B. However, since source file "B" did not change between the first and second versions of the set of source files, the second version includes a reference value 186 indicating that source file "B" in the first version is to be reused in the second version of the set of source files. As a result, the actual size of subsequent versions of the set of source files may be reduced by referencing unchanged source files that were previously stored on the Primary global server 182B.

Additionally, prior to the renaming method discussed in greater detail above, the file directory structure of the second version of the set of source files on content server 184B is substantially similar to the second version stored at the source server 180B. Except that under the root directory a temporary sub-directory 192 was created for the changed source file "A'." Also, a temporary sub-directory 194 was created under sub-directory root "D1" for the new files "E" and "F."

Content server 184C shows the second version of the file directory structure for the set of source files after renaming has occurred. The temporary subdirectory 192 is deleted and source file "A'" has replaced the previous version source file "A." Also, the temporary sub-directory 194 is deleted and the new source files "E" and "F" are under the "D1" sub-directory.

Figure 6A:
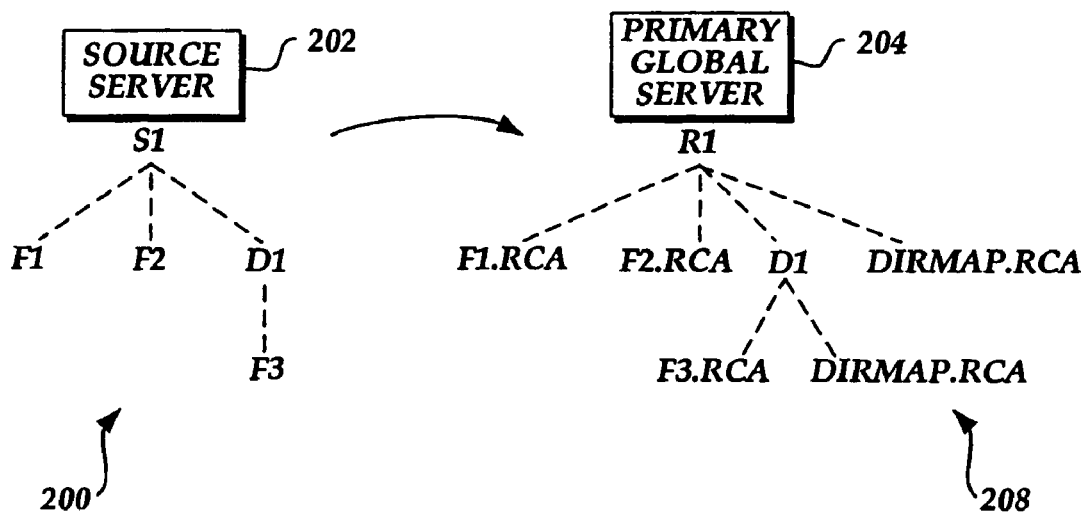
FIG. 6A is an overview of the initial versioning of a source tree that is created on the source server and copied to the Primary global server.

In FIG. 6A, a file tree 200 representing a set of source files on a source server 202 is shown. Directly below an "S1" root directory, two source files "F1" and "F2" are positioned along with a "D1" sub-directory which is a root for a source file "F3." Further, each source file in the file tree 200 is represented in a versioned file tree repository 208 of RCE archived source files with an RCA file extension. However, it is understood that other types of libraries may be employed with the present invention to archive a source file and produce an archived source file with another file extension.

In the versioned file tree repository 208, two RCE archived source files "F1.RCA" and "F2.RCA," a sub-directory "D1" and a directory map "DIRMAP.RCA" are located below an "R1" root directory, i.e., R1/F1.RCA R1/F2.RCA, R1/D1 and R1/DIRMAP.RCA. Also, an archived source file "F3.RCA" and a directory map "DIRMAP.RCA" are disposed below the "D1" sub-directory level, i.e., R1/D1/F3.RCA and R1/D1/DIRMAP.RCA.

Each level of the versioned file tree repository 208 includes an RCE archived directory map file named DIRMAP.RCA. For each version of the set of source files copied from the source servers and archived on the Primary global server, the directory map file includes the version, size and time stamp for each RCE archived source file and sub-directory at the same directory level in the versioned file tree repository 208 as the particular directory map file. Also, for the top level directory map file, the present invention generates an alias name that maps a particular version of the set of RCE archived source files to the actual version of the set of source files that are provided to the local content servers.

For example, when the initial version of the actual set of source files is provided to the local content servers, the top level directory map (R1/DIRMAP.RCA) will include a versioned list that maps the initial version value ("1.1") to a set of RCE archived source files and an alias name. In this case, the list for R1/DIRMAP.RCA would include <F1, 1.1>, <F2, 1.1>, <D1, 1.1> and <V1, 1.1>. Similarly, the list for the "D1" sub-directory map file (R1/D1/DIRMAP.RCA) would include <F3, 1.1>. It is to be appreciated that only the top level directory map file contains an alias name ("V1") to map the actual version of the set source files provided to the content servers to the version of the RCE archived set of source files on the Primary global server.

Figure 6B:
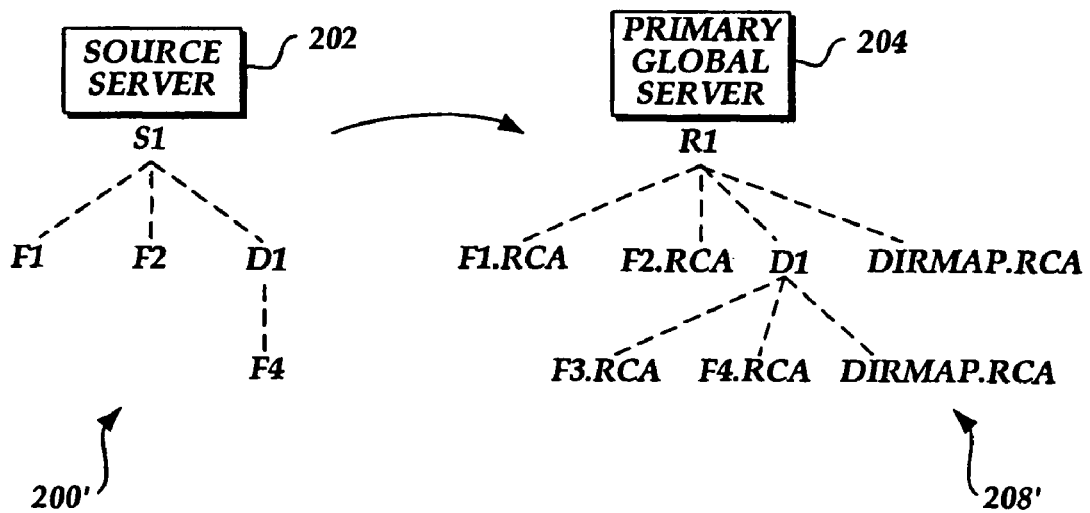
FIG. 6B is an overview of the second versioning of a source tree that is modified on the source server and copied to the Primary global server.

FIG. 6B shows a modified file tree 200' for a second version of the set of source files created on the source server 202. Directly below the "S1" root directory is disposed a modified source file "F1'," the previously existing and unchanged source file "F2" and the "D1" sub-directory for a new source file "F4." A modified versioned file tree repository 208' for the set of RCE archived source files is located on the Primary global server 204 below the "R1" root directory which includes the modified RCE archived source file "F1.RCA," a directory map "DIRMAP.RCA," the unchanged RCE archive source file "F2.RCA" and a sub-directory "D1." Also, below the "D1" sub-directory level is disposed the previously existing RCE archive source file "F3.RCA" that is deleted from the second version of the set of source files on the source server 202, a new RCE archived source file "F4.RCA" and another directory map "DIRMAP.RCA."

The RCE library provides for automatically incrementing the version of new and changed archived source files. In this case, the second version value ("1.2") is automatically associated with the changed RCE archived source file "F1.RCA" and the new RCE archived source file "F4.RCA." Also, the alias name of "V2" is mapped to the RCE archived source files associated with the second version value ("1.2"). In this exemplary embodiment, the top level directory map file (R1/DIRMAP.RCA) contains a list that associates first and second version values with RCE archived source files, sub-directories and alias names, e.g., the R1/DIRMAP.RCA list contains <F1, 1.2>, <F2, 1.1>, <D1, 1.2>, <V1, 1.1> and <V2, 1.2>. It is further envisioned that each modified RCE archived source file will contain every previous version of the file, e.g., "F1.RCA" would include the 1.1 and the 1.2 versions of the RCE archived source file. Similarly, the sub-directory directory map file (R1/D1/DIRMAP.RCA) would contain a list that includes <F3, 1.1> and <F4, 1.2>.

It is important to note that the alias names ("V1" and "V2") in the top level directory map file are used to reference all of the new or changed files for each version in the versioned file repository of the set of RCE archived source files. In this way, the present invention can employ the alias names to support duplicate versioned file tree repositories when the version sequence for updating a set of source files is not identical for every content server. Also, the use of an alias name enables the present invention to only touch/access the new/changed RCE archived source files and directories when updating the version of a set of source files on a local content server.

In the example discussed above, the first and second versions ("1.1" and "1.2") of the actual set of source files provided to the local content servers were associated with the alias names "V1" and "V2," respectively. However, it is envisioned that a subsequent version upgrade to the actual set of source files provided to a local content server might skip a version that is RCE archived on the Primary global server. For example, a fourth version of the set of RCE archived source files could be employed to provide the third version upgrade to the set of source files on the local content servers. In this case, an alias name of "V4" would be mapped to the third version upgrade ("1.3") of the set of RCE archived source files stored in a versioned file tree repository on the Secondary global server.

System Configuration

Figure 7:
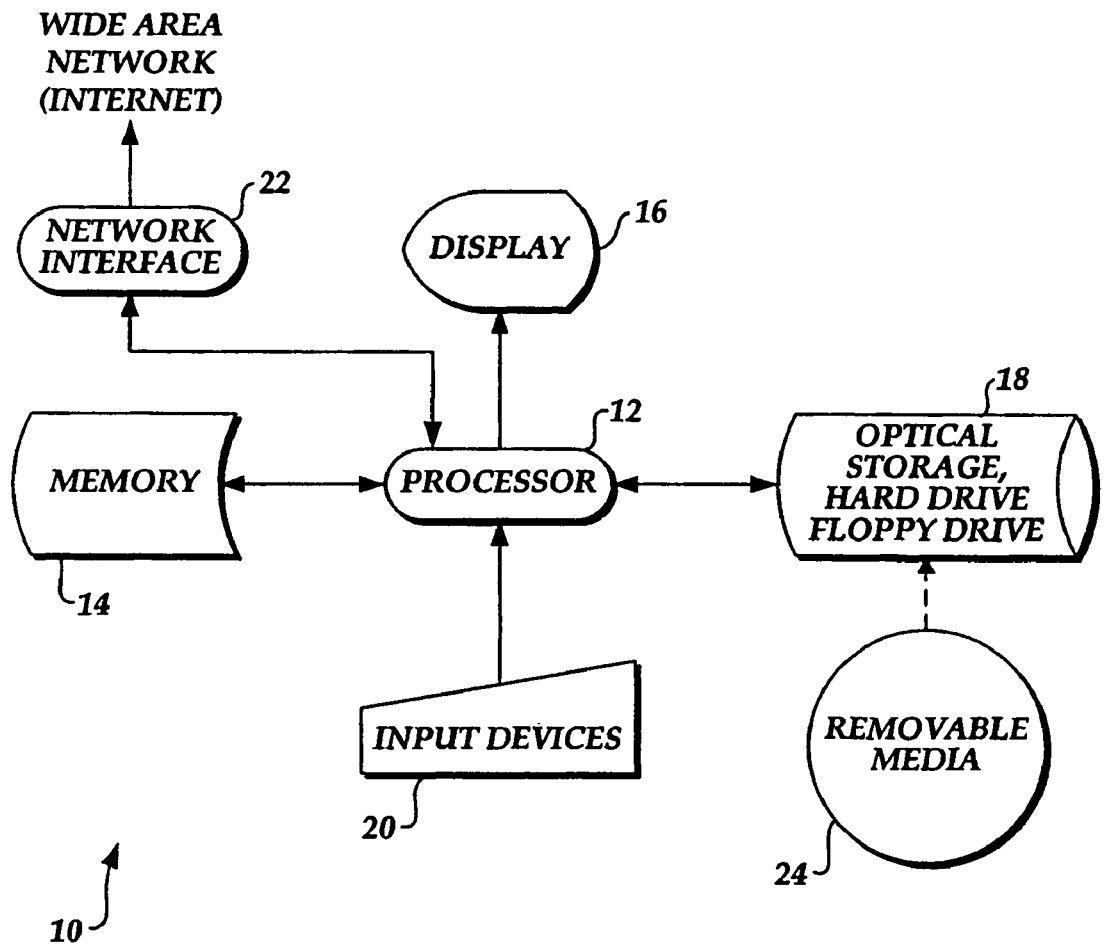
FIG. 7 illustrates an exemplary server computer system.

FIG. 7 is a pictorial diagram of a Primary global server 10 suitable for executing an application program embodying the present invention. FIG. 7 shows a processor 12 coupled bi-directionally to a memory 14 that encompasses read only memory (ROM) and random access memory (RAM). ROM is typically used for storing processor specific machine code necessary to bootup the computer comprising the Primary global server 10, to enable input and output functions, and to carry out other basic aspects of its operation. Prior to running any application program, the machine language code comprising the program is loaded into RAM within memory 14 and then executed by processor 12. Processor 12 is coupled to a display 16 on which the visualization of an HTML response discussed above is presented to a user. Often, programs and data are retained in a nonvolatile memory media that may be accessed by a compact disk-read only memory (CD-ROM) drive, compact disk-read/write memory (CD-R/W) drive, optical drive, digital versatile disc (DVD) drive, hard drive, tape drive and floppy disk drive, all generally indicated by reference numeral 18 in FIG. 7. A network interface 22 couples the processor 12 to a wide area network such as the Internet.

As noted above, embodiments of the present invention can be distributed for use on the computer system for the Primary global server 10 as machine instructions stored on a memory media such as a floppy disk 24 that is read by the floppy disk drive. The program would then typically be stored on the hard drive so that when the user elects to execute the application program to carry out the present invention, the machine instructions can readily be loaded into memory 14. Control of the computer and selection of options and input of data are implemented using input devices 20, which typically comprise a keyboard and a pointing device such as a mouse (neither separately shown). Further details of the system for the Primary global server 10 and of the computer comprising it are not illustrated, since they are generally well known to those of ordinary skill in the art. Additionally, computer systems for a Secondary global server and the content server could be configured in substantially the same way as the computer system for the Primary global server 10 illustrated here, albeit different in other ways.

Other Illustrative Embodiments of the Invention

Figure 8:
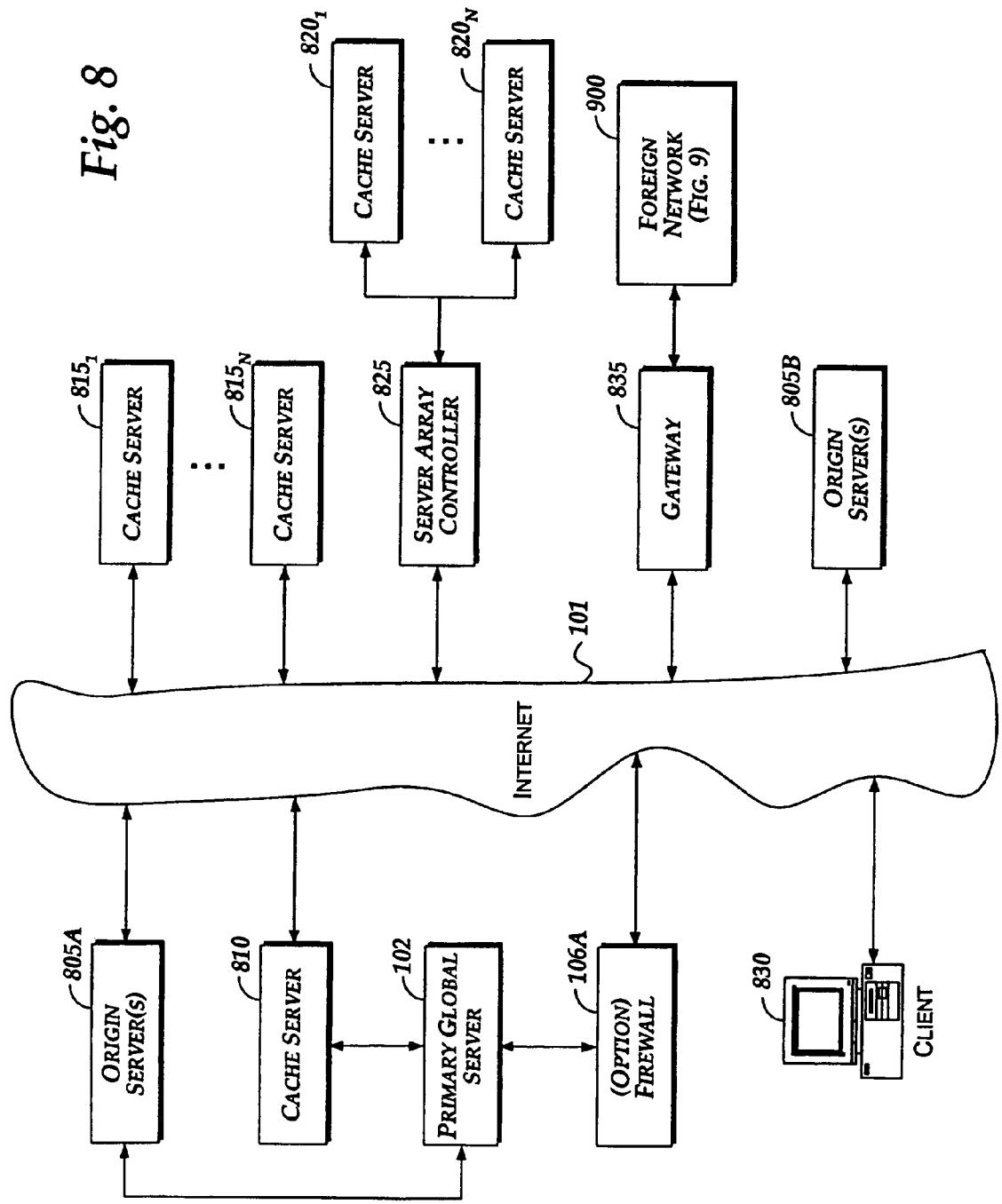
FIG. 8 shows a system for updating and delivering content.

FIG. 8 shows a system for updating and delivering content, according to one embodiment of the invention. The system may include the Internet 101, origin servers 805A and 805B, cache servers 810, $815_{1-N}$, and $820_{1-N}$, server array controller 825, firewall server 106A, client 830, gateway 835, and foreign network 900.

Content servers include any server capable of sending content to a requesting device, such as client 830. Two such types of content servers are a cache server, such as cache server 810, and an origin server, such as origin servers 805A and 805B. Generally, origin servers are servers upon which original content is stored or generated. "Generated" in this context means content that is created, at least in part, on-the-fly by the origin server. For example, an origin server may include a database having entries about the status of orders. A customer may query the origin server to determine the status of an order placed by the customer. In response to the customer's query, a Web page may be generated that, in addition to the relevant order status, includes advertisements, notices, and/or other information that may be useful to the customer. To conserve storage space and compute resources, such a page is typically generated on request by a program executing on the origin server.

Information about products, on the other hand, may be statically stored and not require on-the-fly generation on a description that is changed infrequently. A picture of the product and its description may be placed on a Web page. The Web page may have no other elements that need to be generated. This is what is generally referred to as a static Web page. Such pages may be created and then distributed to content servers. They may be distributed from source servers to content servers using mechanisms of primary global server 102 as described previously.

In contrast to origin servers, cache servers cache content and send it to requestors upon request. The content may be a copy of content on other servers such as an origin server, a content publishing system (such as primary global server 102), or another cache. By caching frequently requested content, a cache server may greatly decrease the time between a request and a response to the request (known as response latency). A client, such as client 830, may be unaware that the content server responding is a cache server rather than an origin server.

A cache server, such as cache server 810, may be coupled more directly to primary global server 102, or it may be coupled to global server 102 over a network, such as Internet 101. Cache servers may be arranged in arrays, such as cache servers $815_{1-N}$ and $820_{1-N}$. A device connected to Internet 101, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. Cache servers $815_{1-N}$ may be located in one geographical location or may be spread to many different locations. Cache servers may be coupled to Internet 101 through firewalls or other packet-filtering systems for security and/or other reasons.

Server array controller 825 makes cache servers $820_{1-N}$ appear to requestors as a single unified cache. It does this by redirecting a message directed to it to one of cache servers $820_{1-N}$. It may redirect such messages based on many metrics including load balancing metrics. It may perform network address translation (NAT) and/or other translations, such as port address translation (PAT), to maintain the appearance that it is a single cache. Each cache server in FIG. 8 could be replaced with a server array controller controlling an array of cache servers without departing from the spirit or scope of the invention.

When distributing a version of content, primary global server 102 may interact differently with cache servers than with origin servers. For example, primary global server 102 may cause some origin servers to go offline, i.e., to stop servicing requests for content, while allowing other origin servers to remain online to service requests occurring during updating the offline origin servers. For example, primary global server 102 may cause half the origin servers to go offline, update content on them, cause them to go online, and then cause the other half to go offline while updating content on them. During the update process, requestors are able to get information from the online origin servers.

When primary global server 102 distributes a version of content, it may change operation of the cache servers. For example, it may cause the cache servers to go into a check-for-new-content mode in which each cache server sends a request for content to an origin server to determine if new content exists and, if so, to cache it. In typical operation, when a cache server does not have requested content, it requests the content from an origin server. It then caches the content together with a time to live (TTL) field that indicates how long the cached content may be used before the cache server must re-request it from an origin server. The content together with the TTL field and other information may be stored in a record called a cache entry (also called simply an entry). When a requestor requests content that the TTL field indicates has gone stale (passed its time to live), the cache server re-requests the content from an origin server.

When requesting content from an origin server, a cache server may request that the content be sent only if it has changed since the last request to the origin server. For example, the cache server may send a time stamp or version of the content that indicates when the content was created. When an origin server receives such a request, it may compare the time stamp or version received from the cache server to the time stamp or version of the corresponding content the origin server has stored. If the origin server's content is more recent, it sends the content to the requestor which then replaces its content and stores another time stamp or version with the content. If the origin server's content is not more recent, it may send a response that indicates that the content is up-to-date. The cache server may then determine that it has the most recent version of the content and reset the TTL field for the content. This method of querying for content that has changed may be used to conserve bandwidth that might be required if an origin server always sent content, whether new or not, in response to a request from a cache server.

Alternatively, after updating content on origin servers, primary global server 102 may expire appropriate entries on cache servers and cause the cache servers to pre-populate cache entries. Pre-populating refers to obtaining content on a cache server in response to a command, even if it has been not been requested by a requestor. Pre-populating may occur either by a primary (and/or secondary) global server pushing the content to the cache servers or by the primary (and/or secondary) global server expiring cache entries on the cache servers and requesting that the cache servers request the expired entries, i.e., pull the content from origin servers.

In pushing, a server initiates and sends content to another device. That is, the server may send content to the other device without waiting for the other device to request the content. For example, a process may run on the other device that "listens" for a push request from the server. When the process receives a push request, it prepares to receive data from the server and does so.

In pulling, a device initiates a transfer of content by requesting content from a server. That is, the device does not need to be ready to receive content any time the server should try to send it; rather, the device requests content which the server then sends.

A primary (and/or secondary) global server may simply expire the entries in a cache server corresponding to the updates, causing a cache server to check for new content on an origin server when it receives a request for an expired entry.

After an update, a primary (and/or secondary) global server may expire all the entries in a cache server, causing a cache server to check for new content on an origin server when it receives a request for any of the entries on the cache server.

A cache server may cache content for more than one customer. That is, a cache server may be partitioned between multiple customers. Each customer may be assigned a percentage or portion of the capacity of the cache server. Expiring and pre-populating cache entries may be done on a customer-by-customer basis.

Furthermore, pre-populating cache entries for a customer may be partitioned. For example, a customer may have several Web pages that a cache server should cache. Such Web pages may be divided by companies the customer controls or owns or by divisions of a company the customer controls or owns. A pre-populating command may apply to Web pages for one or more companies associated with the customer or may apply to one or more divisions within a single company associated with the customer. In a more general sense, cache servers may have any arbitrary set of Web pages pre-populated or expired whether or not the Web pages are related to each other without departing from the spirit or scope of the invention.

It will be recognized that by informing each cache server of expired entries, a cache server may forgo polling an origin server to determine if content has been updated. In fact, a time to live field may be disposed of as each cache server can be explicitly told when entries have expired by a global server. For example, a system like those described above, in which primary and/or secondary global servers inform cache servers when content has been updated allows cache servers to skip polling for new content as they are told when new content is available. This has several advantages including reducing bandwidth consumed in polling activities, reducing response latency, and eliminating compute time required to poll for new content.

Client 830 requests content from content servers. Client 830 includes any device capable of connecting with Internet 101. Such devices may include devices that typically connect using a wired communications medium such as personal computers, multiprocessor systems, microprocessor-based or programmable consumer electronics, network PCs, and the like. Such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like.

In addition, client 830 may also include devices that are capable of connecting using a wired or wireless communication medium such as PDAs, POCKET PCs, wearable computers, and other devices mentioned above that are equipped to use a wired and/or wireless communications medium.

Gateway 835 relays messages between foreign network 900 and Internet 101. When primary global server 102 expires cache entries on cache servers, it may also send expiration messages to gateway 835 for relaying to foreign network 900. Additionally, when primary global server 102 pre-populates cache servers, it may also pre-populate cache servers on foreign network 900.

Figure 9:
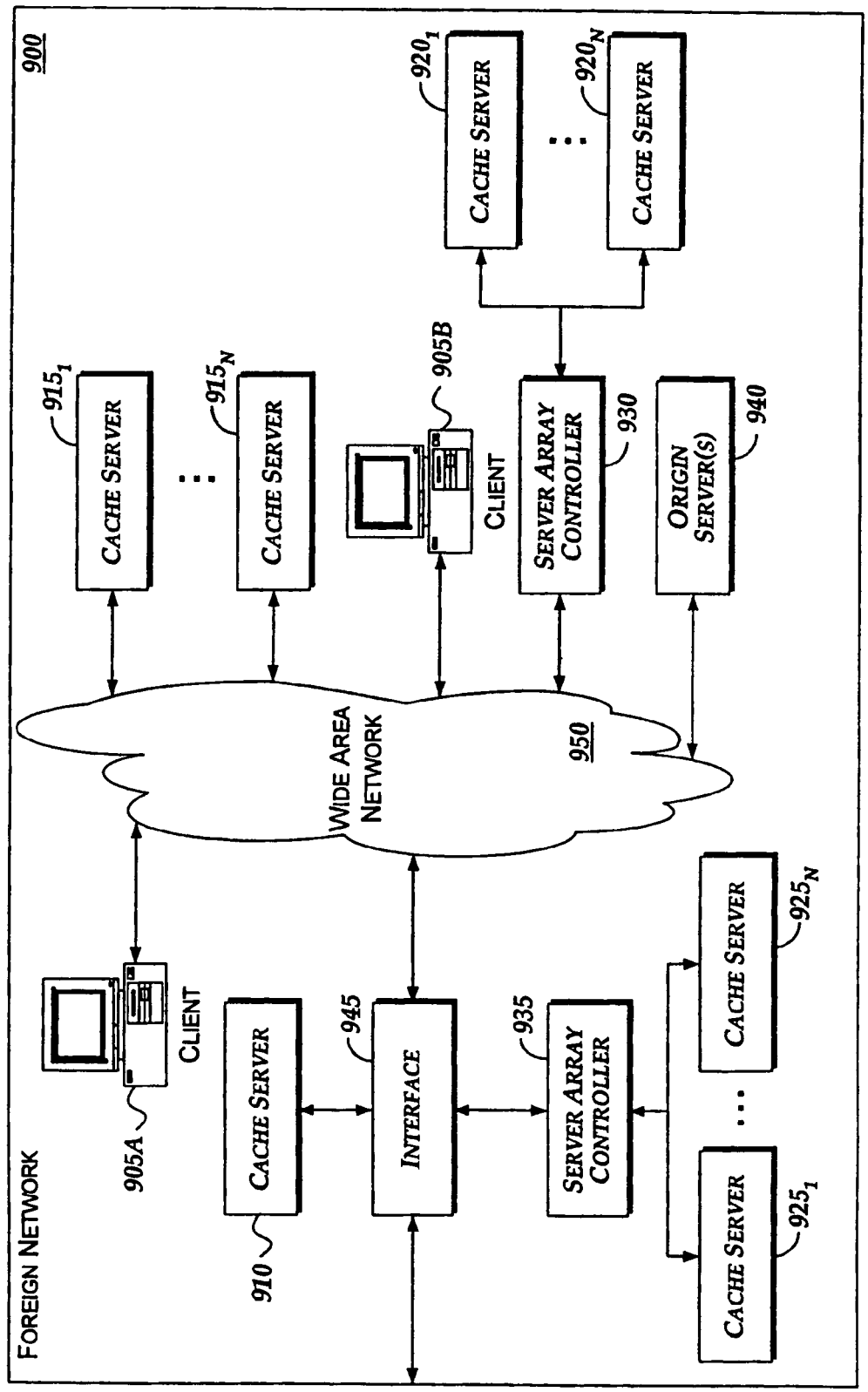
FIG. 9 shows a system on a foreign network that may cache and deliver content.

Foreign network 900 is described in more detail in conjunction with FIG. 9. Briefly, foreign network 900 is any network that can be coupled to Internet 101 through a gateway such as gateway 835.

FIG. 9 shows a system on a foreign network that may cache and deliver content, according to one embodiment of the invention. The system includes clients 905A and 905B, cache servers 910, 915$_{1-N}$, 920$_{1-N}$, 925$_{1-N}$, server array controllers 930 and 935, origin server(s) 940, interface 945, and wide area network 950.

The network shown in FIG. 9 might be used when a company provides a dial in service. When a user dials into the service, for example client 905B, the user is connected to a private network. As long as the user accesses content within the network, traffic from and to the user stays within the network shown. When a user tries to access content on another network, such as Internet 101, a determination may be made as to whether that content already exists within the private network on an origin server, such as origin server(s) 940, or on a cache server. If it is determined that the content does exist within the network, the client is directed to the appropriate content server; otherwise, the client's request is forwarded to an external network, such as Internet 101, to fulfill the request.

Clients 905A and 905B are coupled to wide area network 950 of foreign network 900. They may request content that is supplied by a content server within foreign network 900 or a content server foreign to foreign network 900. Physically, clients 905A and 905B are similar to client 830 of FIG. 8.

Interface 945 provides an interface between foreign network 900 and Internet 101. It may be used by a primary global and/or secondary global server to update cache servers within foreign network 900. For example, it may receive an expiration message sent from primary global server 102 of FIG. 8. It may then use its knowledge of cache servers on foreign network 900 to propagate the expiration message to cache servers in foreign network 900.

Additionally, interface 945 may be used when a requestor from a foreign network requests content from foreign network 900. Upon receipt of a request, interface 945 may determine a suitable cache server to service the request.

Similarly, interface 945 may be used when a requestor within foreign network 900 requests content from a server on Internet 101. Interface 945 may intercept such a request, determine that a server within foreign network 900 has the requested content, and refer the request to the determined server.

Cache server 910 is coupled to interface 945 and performs the functions of a cache server, such as cache server 810 of FIG. 8. It may be closely coupled to interface 945 as shown in FIG. 9, so that interface 945 may quickly retrieve and send content from cache server 910 in response to a request.

Cache servers on foreign network 900 may be arranged in arrays, such as cache servers 915$_{1-N}$. A device connected to wide area network 950, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. Cache servers 915$_{1-N}$ may be located in one geographical location or may be spread to many different locations. Cache servers may be coupled to wide area network 950 through firewalls or other packet-filtering systems for security and/or other reasons.

Server array controllers 930 and 935 make cache servers 920$_{1-N}$ and 925$_{1-N}$, respectively, each appear to requestors as a single unified cache, similar to how server array controller 825 make cache servers 820$_{1-N}$ appear to requestors as a single unified cache. Server array controller 935 may have requests for content that were previously directed at interface 945 directed at it, while server array controller 930 may have requests for content directed to a server on wide area network 950 directed to it.

Origin server(s) 940 are optional. That is, they may not exist on foreign network 900 at all. When they do exist, they operate similar to origin servers 805A and 805B as described in more detail in conjunction with FIG. 8.

Wide area network 950 couples various components of FIG. 9 together. It may be implemented in wired and/or wireless technologies. In another embodiment of the invention, wide area network 950 is replaced with a local area network or a wide area network and one or more local area networks.

Figure 10:
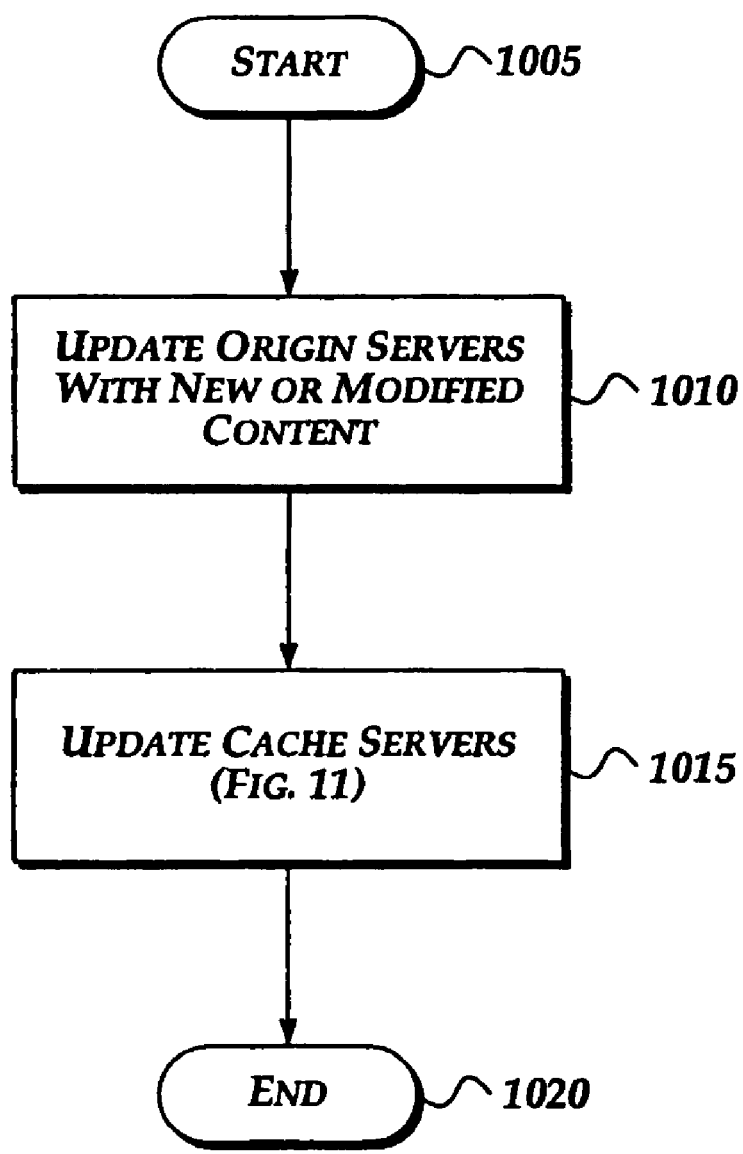
FIG. 10 is a flowchart illustrating an overview of a process for updating content on origin and cache servers.

FIG. 10 is a flowchart illustrating a process for updating content on origin and cache servers. The process begins at block 1005 after a version of source files is ready to be distributed.

At block 1010, origin servers are updated with new or modified content. As described previously, primary and/or secondary global servers update versions of source files on each local origin server. They may do so by causing some origin servers to go offline during part of the update while causing other origin servers to go offline during another part of the update. For example, referring to FIG. 8, primary global server 102 updates content on origin servers 805A and 805B.

Figure 11:
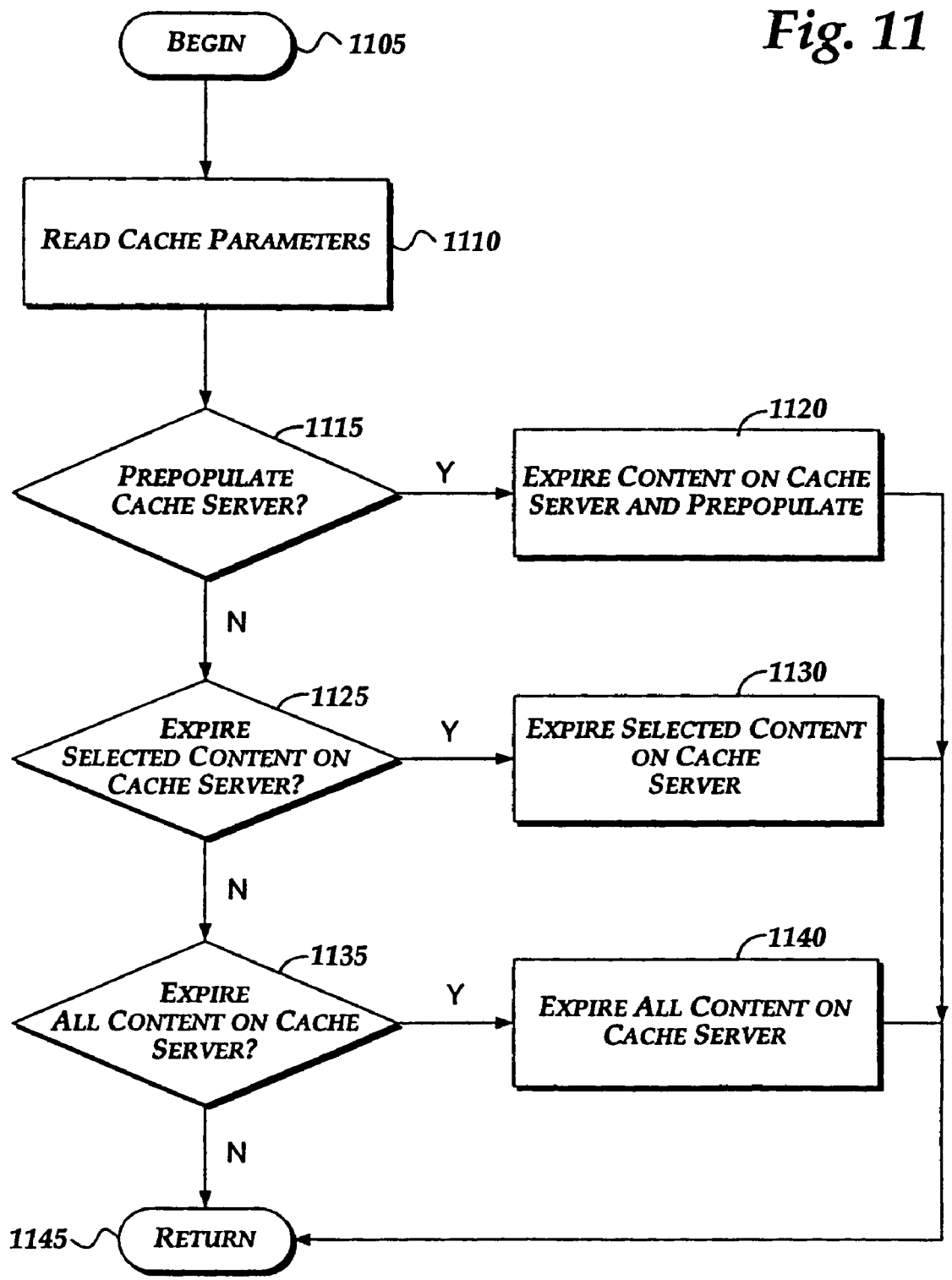
FIG. 11 is a flowchart illustrating a process to update cache servers.

At block 1015, cache servers are updated as described in more detail in conjunction with FIG. 11. Briefly, depending on cache configuration parameters, cache servers have content entries expired and pre-populated or expired without pre-populating.

At block 1020, the process returns to processing other actions. At this point, origin servers have been updated with a version of source files and cache servers have been updated appropriately.

FIG. 11 is a flowchart illustrating a process to update cache servers. The process begins at block 1105 after one or more global servers have updated content on origin servers.

At block 1110, cache parameters are read. For example, one or more databases may be configured to store how the content on a cache server should be updated. Each cache server may be configured independently of another cache server. Cache parameters indicate actions that should be taken during and after origin servers are updated including whether a cache server should be pre-populated or whether cache entries should be expired without pre-populating the cache server.

At block 1115, a determination is made as to whether the cache parameters indicate that the cache server should be pre-populated. If so, processing branches to block 1120; otherwise, processing branches to block 1125.

At block 1120, content on the cache server is expired and the cache server is pre-populated. As indicated earlier, this may occur as a push from primary and secondary global servers or as a pull by the cache server from origin servers. For example, referring to FIG. 8, content on cache server 810 is expired and cache server 810 is instructed to pull content from origin servers for the content expired. Cache server 810 responds by pulling content from origin server 805A.

At block 1125, a determination is made as to whether the cache parameters indicate that selected content on the cache servers should be expired. If so, processing branches to block 1130; otherwise, processing branches to block 1135. The content selected may be equivalent, a superset, or subset or the content updated previously on origin servers.

At block 1130, the selected content on the cache server is expired. For example, content related to one division of a company may be expired.

At block 1135, a determination is made as to whether the cache parameters indicate that all content on a cache server should be expired. If so, processing branches to block 1140; otherwise, processing branches to block 1145. Invalidating all content on a cache server may be done for efficiency or other reasons.

At block 1140, all content on the cache server is expired. For example, content for all customers having cached content on a cache server may be expired.

At block 1145, processing returns to the calling process. At this point, cache parameters have been read and cache content has been expired and may have been pre-populated. A calling process could call the process shown in FIG. 11 multiple times to update more than one cache server.

Figure 12:
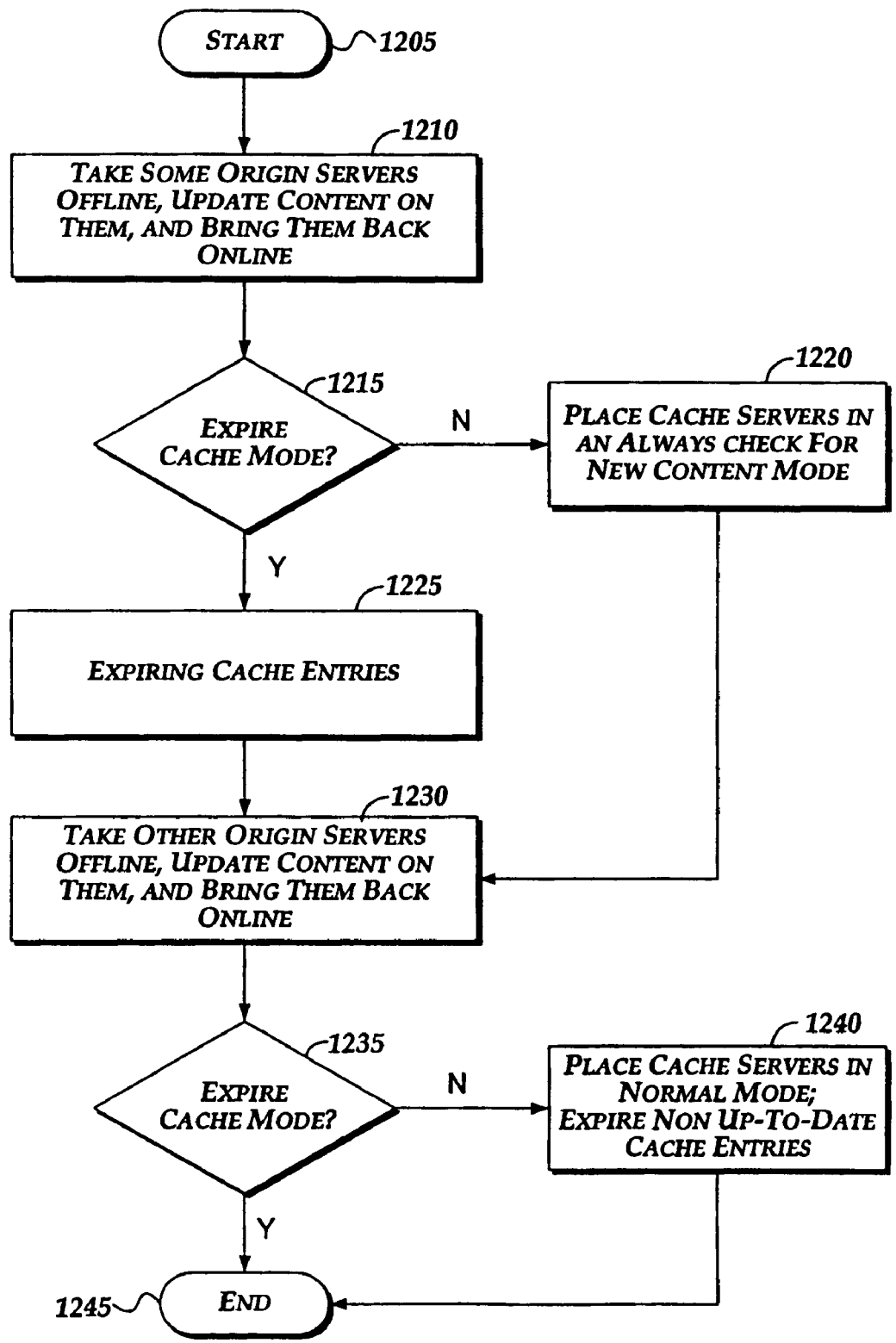
FIG. 12 is a flowchart illustrating a process to update content on origin and cache servers in accordance with the invention.

FIG. 12 is a flowchart illustrating a process to update content on origin and cache servers, according to one embodiment of the invention. The process begins at block 1205 after a version of source files is ready to be distributed.

At block 1210, some origin servers are taken offline, the content is updated on them, and then they are brought back online. For example, referring to FIG. 8, origin server 805A is brought offline, its content is updated, and then it is brought online. During this time, origin server 805B remains online to service requests.

At block 1215, a determination is made as to whether the cache entries should be expired. If so, processing branches to block 1225; otherwise, processing branches to block 1220.

At block 1220, cache servers are placed in an always-check-for-new-content mode. In this mode, with each request for content, a cache server makes a request from an origin server to determine if the cache server has updated content. For example, referring to FIG. 8, cache server 810 is placed in an always-check-for-new-content mode. After it is placed in this mode, it receives a request for content from client 830. Cache server 810 then ignores whether the cache entry still has TTL. Rather, it queries origin server 805B to determine if it has updated content.

At block 1225, cache entries are expired. For example, referring to FIG. 8, entries in cache server 810 are expired in response to updates to content on origin server 805A.

At block 1230, other content servers are taken offline, the content is updated on them, and then they are brought back online. For example, referring to FIG. 8, origin server 805B is brought offline, its content is updated, and then it is brought online. During this time, origin server 805A remains online to service requests.

At block 1235, a determination is made as to whether the cache entries should be expired. If so, processing branches to block 1245; otherwise, processing branches to block 1240.

At block 1240, the cache servers are placed in normal mode (not always checking for new content) and all non up-to-date cache entries are expired. Some entries, for example, may have been refreshed during the always-check-for-new-content mode. These entries would not need to be expired at this time. For example, referring to FIG. 8, cache server 810 is placed in normal mode and non up-to-date cache entries are expired. After it is placed in normal mode, it receives a request for content from client 830. Cache server 810 then determines whether the cache entry has expired. If it has, cache server 810 requests new content from origin server 805B.

At block 1245, the process returns to processing other actions. At this point, content on origin servers has been updated and cache entries on cache servers have been expired. For a period of the update, cache servers may have operated in an always-check-for-new-content mode.

It is to be understood that embodiments of the present invention can be created to support all file based content and applications including GIF, TIFF, AVI, JPEG, MPEG, HTML pages, JAVA scripts, Active Server pages, postscript document format (PDF), ActiveX, JAVA, and application programs. It is envisioned that embodiments of the present invention provides security mechanisms for protecting the delivery of content and application files to content servers. These security mechanisms enable remote administration of the present invention through a secure shell command line (SSH) and a secure socket layer (SSL) for browser based administration.

It is envisioned that embodiments of the present invention will enable a new content server to be deployed with minimal effort. A Primary or Secondary global server can employ the contents of the most current update file tree object to automatically generate a current version of the set of source files for a new local content server. Additionally, an important aspect of the present invention is that proprietary software does not have to be installed on the source servers or content servers to receive the benefits of the present invention.

Various components have been mentioned in this document, including servers, such as cache servers and origin servers, server array controllers, firewalls, etc. Each of these components may be implemented in software and/or hardware. The software of a component may include a process or set of processes that execute on one or more electronic devices. The hardware of a component may include one or more personal computers, processors, multiprocessor systems, microprocessor-based or programmable consumer electronics, network PCs, cell phones, smart phones, pagers, walkie talkies, radio frequency (RF) devices, infrared (IR) devices, CBs, PDAs, POCKET PCs, wearable computers, cards (also known as blades) inserted into such devices, integrated devices combining one or more of the proceeding, and the like.

A blade may include, for example, one or more processors, volatile and non-volatile memory, interfaces suitable for transferring information to and from the blade, and other components known to those skilled in the art. For example, a blade may include a specialized interface for transferring information to a backplane and other interfaces, such as a USB port, serial port, RF interface, IR interface, and IDE controller for transferring information to other devices.

The various embodiments of the invention may be implemented as a sequence of computer implemented steps or program modules running on a computing system and/or as interconnected machine logic circuits or circuit modules

What is claimed as new and desired to be protected by Letters Patent of the United States is:

1. A system for updating content on a network, comprising:
   an origin server configured to provide access to content in response to a request;
   a cache server configured to receive each request and determine whether the request is for a first content associated with an entry on the cache server, and if the request is for the first content that is unavailable on the cache server, employing the request to access the first content with the origin server; and
   another server configured to:
      update the first content on the origin server, wherein updating the first content on the origin server comprises distributing a version of first content from the other server to the origin server;
      enable the cache server to query the origin server for the first content if the first content is indicated as unexpired at the cache server;
      send a message to the cache server in response to updating the first content on the origin server, wherein the message from the other server includes a command to expire at least one entry in the cache server related with the first content;
      based on sending the command, automatically push the updated first content to the cache server prior to a request for the updated version of the file;
      taking off-line at least one of a plurality of origin servers with a second content that corresponds to content on at least one of the plurality of origin servers that remains on-line, and updating the second content on each off-line origin server with a third content; and
      if the second content is updated with the third content on each off-line origin server, bringing each off-line origin server with the updated third content back on-line and automatically updating content on the cache server that corresponds to the third content on each origin server that is brought back on-line.

2. The system of claim 1, wherein the other server pre-populates an updated version of a file on the cache server prior to a request for the updated version of the file by receiving a request for the updated version of the file from the cache server.

3. The system of claim 1, wherein the other server performs actions, comprising:
   if a period of time passes, automatically expiring a time field associated with at least a portion of the first content on the cache server; and
   automatically updating each entry for a version of each file associated with the expired first content with a current version of each file from the origin server.

4. The system of claim 1, wherein the other server automatically updates each version of each file associated with the expired first content on the cache server with a current version of each file from the other server.

5. The system of claim 1, wherein the other server performs actions comprising:
   if a period of time passes, automatically expiring a time field associated with all content on the cache server; and
   automatically updating each entry for a version of each file associated with the expired content with a current version of each file from the origin server.

6. The system of claim 1, wherein the other server performs actions comprising:
   in response to a request for content on the cache server, automatically comparing the requested content to corresponding content on the origin server to determine whether the requested content on the cache server is current; and
   automatically updating each entry on the cache server associated with the requested content that is determined to be non-current with a current version of each file from the origin server that is associated with the requested content.

7. The system of claim 1, wherein the message includes a command to expire an entry associated with the first content in the cache server.

8. The system of claim 1, wherein the message includes a command to pre-populate updated content for each entry on the cache server that is associated with an expired time field.

9. The system of claim 1, wherein the message sent to the cache server causes a time field for all entries to expire.

10. A method for updating content on a network, comprising:
   at an origin server: providing access to content associated with the origin server in response to a request;
   at a cache server:
      receiving each request; and
      determining whether the request for a first content is associated with an entry on the cache server, and if the request is for the first content that is unavailable on the cache server, employing the request to access the first content with the origin server; and
   at another server:
      updating the first content on the origin server;
      enabling the cache server to query the origin server for the first content if the first content is available and unexpired at the cache server;
      sending a message to the cache server in response to updating the first content on the origin server, wherein the message comprises a command to modify a time field of at least one entry in the cache server;
      based on the command, further pushing the updated first content to the cache server before a request for the updated first content is received;
      taking off-line at least one of a plurality of origin servers with a second content that corresponds to content on at least one of the plurality of origin servers that remains on-line, and updating the second content on each off-line origin server with a third content; and
      if the second content is updated with the third content on each off-line origin server, bringing each off-line origin server with the updated third content back on-line and automatically updating content on the cache server that corresponds to the third content on each origin server that is brought back on-line.

11. The method of claim 10, further comprising, at the other server:
   if a period of time passes, automatically expiring a time field associated with at least a portion of the first content on the cache server; and automatically updating each entry for a version of each file associated with the expired first content with a current version of each file from the origin server.

12. The method of claim 10, further comprising, at the other server:
automatically updating each version of each file associated with the expired first content on the cache server with a current version of each file from the other server.

13. The method of claim 10, further comprising, at the other server:
automatically comparing the requested content to corresponding content on the origin server;
determining whether the requested content on the cache server is current; and
automatically updating each entry on the cache server associated with the required content that is determined to be non-current with a current version of each file from the origin server that is associated with the requested content.

14. An apparatus for updating content on a network, comprising:
an origin server configured to provide access to content in response to a request;
a cache server configured to receive each request and determine whether the request is for a first content associated with an entry on the cache server, and if the request is for the first content that is unavailable on the cache server, employing the request to access the first content with the origin server; and
another server configured to:
update the first content on the origin server;
enable the cache server to determine if the origin server has updated first content if the first content has not expired at the cache server;
send a message to the cache server in response to updating the first content on the origin server, wherein sending a message comprises informing the cache server of expired entries for the first content;
based on sending the message, automatically pushing the updated first content to the cache server prior to a request for the updated first content;
taking off-line at least one of a plurality of origin servers with a second content that corresponds to content on at least one of the plurality of origin servers that remains on-line, and updating the second content on each off-line origin server with a third content; and
if the second content is updated with the third content on each off-line origin server, bringing each off-line origin server with the updated third content back on-line and automatically updating content on the cache server that corresponds to the third content on each origin server that is brought back on-line.

15. The apparatus of claim 14, wherein the other server performs actions comprising:
if a period of time passes, automatically expiring a time field associated with all content on the cache server; and
automatically updating each entry for a version of each file associated with the expired content with a current version of each file from the origin server.

16. The apparatus of claim 14, wherein the message includes a command to expire an entry associated with the first content in the cache server.

17. The apparatus of claim 14, wherein the message sent to the cache server causes a time field for all entries to expire.

* * * * *

UNITED STATES PATENT AND TRADEMARK OFFICE
CERTIFICATE OF CORRECTION

PATENT NO. : 7,707,182 B1  Page 1 of 1
APPLICATION NO. : 11/284305
DATED : April 27, 2010
INVENTOR(S) : Thomas E. Kee et al.

It is certified that error appears in the above-identified patent and that said Letters Patent is hereby corrected as shown below:

In column 2, line 14, delete "server" and insert -- serve --, therefor.

In column 5, lines 16-25, delete "Secondary global servers 108A and 108B can provide a current version of a set of source files to their associated local content servers 104B and 104C. Each geographically separate data centers 109 and 111 also includes a server array controller 105B and 105C to manage access to the content and applications on the local content servers 104B and 104C. FIG. 1 should be considered exemplary, not limiting. If desired, one or more than two, geographically separated data centers may be included in a network employing the present invention." and insert the same on Col. 5, Line 15, after "the" as a continuation of same paragraph.

Signed and Sealed this

Ninth Day of November, 2010

David J. Kappos
*Director of the United States Patent and Trademark Office*